US008877393B2

(12) United States Patent
Takeuchi et al.

(10) Patent No.: US 8,877,393 B2
(45) Date of Patent: Nov. 4, 2014

(54) FUEL CELL

(75) Inventors: Hiroaki Takeuchi, Susono (JP); Tomohiro Ogawa, Susono (JP); Ryouichi Nanba, Susono (JP); Takumi Taniguchi, Susono (JP); Shinji Jomori, Susono (JP); Koichiro Ikeda, Susono (JP); Shigeki Hasegawa, Gotemba (JP); Masayuki Ito, Susono (JP); Hitoshi Hamada, Gotemba (JP); Naohiro Takeshita, Toyota (JP)

(73) Assignee: Toyota Jidosha Kabushiki Kaisha, Toyota-shi (JP)

(*) Notice: Subject to any disclaimer, the term of this patent is extended or adjusted under 35 U.S.C. 154(b) by 409 days.

(21) Appl. No.: 13/383,084

(22) PCT Filed: May 21, 2010

(86) PCT No.: PCT/JP2010/003437
§ 371 (c)(1),
(2), (4) Date: Jan. 9, 2012

(87) PCT Pub. No.: WO2011/058677
PCT Pub. Date: May 19, 2011

(65) Prior Publication Data
US 2012/0214082 A1 Aug. 23, 2012

(30) Foreign Application Priority Data

Nov. 12, 2009 (WO) .................. PCT/JP2009/006052

(51) Int. Cl.
*H01M 8/06* (2006.01)
*H01M 8/04* (2006.01)
*H01M 8/10* (2006.01)
*H01M 4/86* (2006.01)
*H01M 8/24* (2006.01)
*H01M 8/02* (2006.01)

(52) U.S. Cl.
CPC ........ *H01M 8/04089* (2013.01); *H01M 4/8605* (2013.01); *H01M 4/8668* (2013.01); *H01M 8/04119* (2013.01); *H01M 8/242* (2013.01); *H01M 8/0273* (2013.01); *H01M 2008/1095* (2013.01); *Y02E 60/50* (2013.01)

USPC ............ 429/413; 429/414; 429/450; 429/480

(58) Field of Classification Search
CPC combination set(s) only.
See application file for complete search history.

(56) References Cited

U.S. PATENT DOCUMENTS 7,273,672 B2 9/2007 Sone et al.
2007/0207371 A1* 9/2007 Ushio et al. ..................... 429/38
(Continued)

FOREIGN PATENT DOCUMENTS

CA 2344377 A1 3/2000
CN 101578730 A 11/2009
(Continued)

*Primary Examiner* — Muhammad Siddiquee
(74) *Attorney, Agent, or Firm* — Sughrue Mion, PLLC

(57) ABSTRACT

A fuel cell is disclosed comprising: a power generation layer including an electrolyte membrane, and an anode and a cathode provided on respective surfaces of the electrolyte membrane; a fuel gas flow path layer located on a side of the anode of the power generation layer to supply a fuel gas to the anode while flowing the fuel gas along a flow direction of the fuel gas approximately orthogonal to a stacking direction in which respective layers of the fuel cell are stacked; and an oxidizing gas flow path layer located on a side of the cathode of the power generation layer to supply an oxidizing gas to the cathode while flowing the oxidizing gas along a flow direction of the oxidizing gas opposed to the flow direction of the fuel gas. A power generation area of the fuel cell, in which electric power is generated, has an upstream region including a most upstream position along the flow direction of the fuel gas and a downstream region including a most downstream position along the flow direction of the fuel gas. A midstream region, which is a remaining region of the power generation area other than the upstream region and the downstream region, has higher water vapor transfer resistance between the anode side and the cathode side than the upstream region and the downstream region.

9 Claims, 28 Drawing Sheets

(56) References Cited

U.S. PATENT DOCUMENTS

| | | |
|---|---|---|
| 2008/0131745 A1* | 6/2008 | Ikeda et al. .................... 429/22 |
| 2008/0135402 A1* | 6/2008 | Jupudi et al. ................. 204/244 |
| 2010/0009238 A1 | 1/2010 | Goto |
| 2010/0068589 A1* | 3/2010 | Saito et al. .................... 429/30 |

FOREIGN PATENT DOCUMENTS

| | | |
|---|---|---|
| JP | 8-148154 A | 6/1996 |
| JP | 2003077497 A | 3/2003 |
| JP | 2003-317747 A | 11/2003 |
| JP | 2005-251699 A | 9/2005 |
| JP | 2006-21004 A | 8/2006 |
| JP | 2006-202570 A | 8/2006 |
| JP | 2007141695 A | 6/2007 |
| JP | 2007-234543 A | 9/2007 |
| JP | 2008-098181 A | 4/2008 |
| JP | 2008-140779 A | 6/2008 |
| JP | 2008-186671 A | 8/2008 |
| JP | 2008-198386 A | 8/2008 |
| JP | 2009-004230 A | 1/2009 |
| JP | 2009-009724 A | 1/2009 |
| JP | 2009-076404 A | 4/2009 |
| JP | 2009-231083 A | 10/2009 |
| WO | WO 2006/043394 A1 | 4/2006 |

* cited by examiner

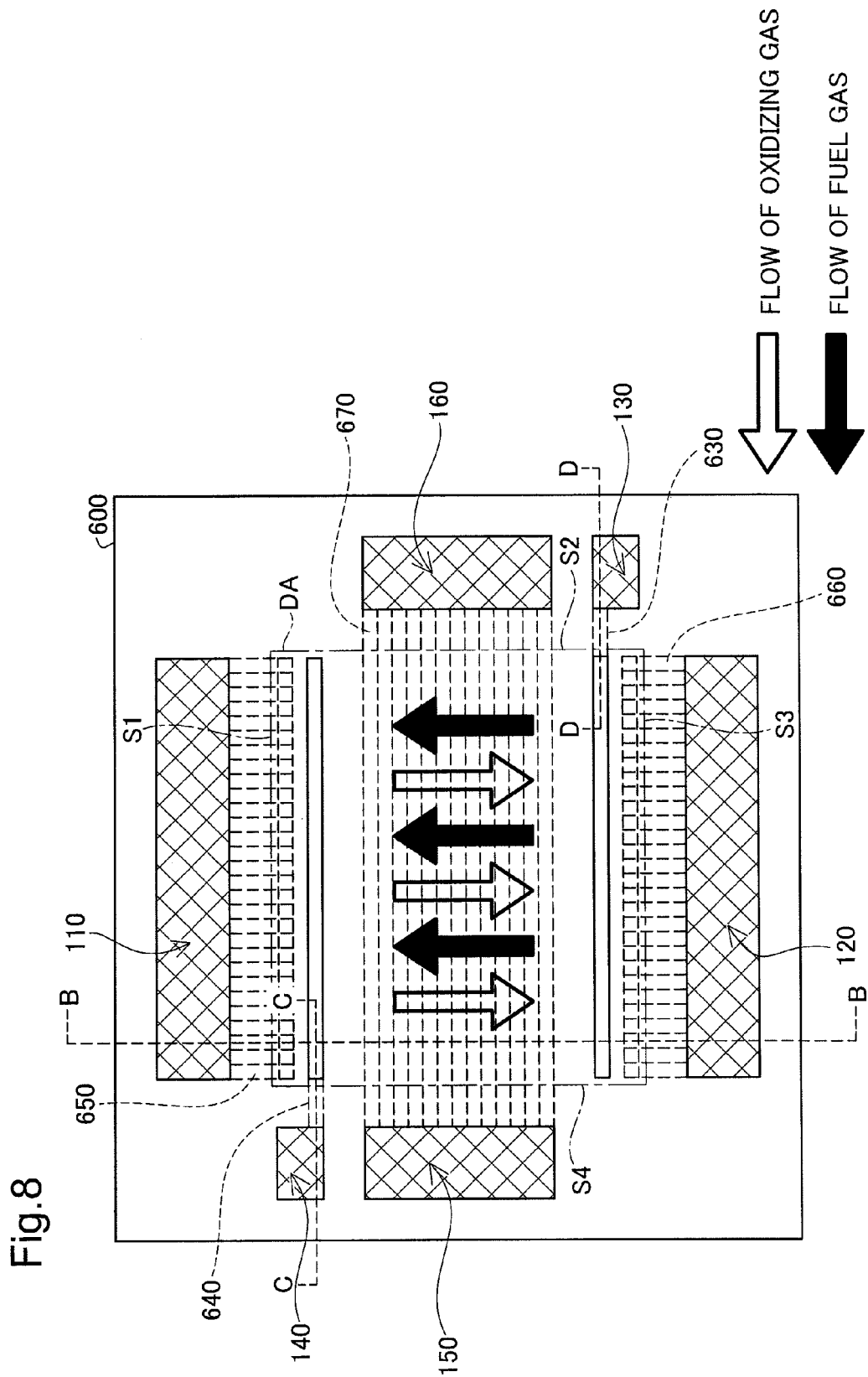

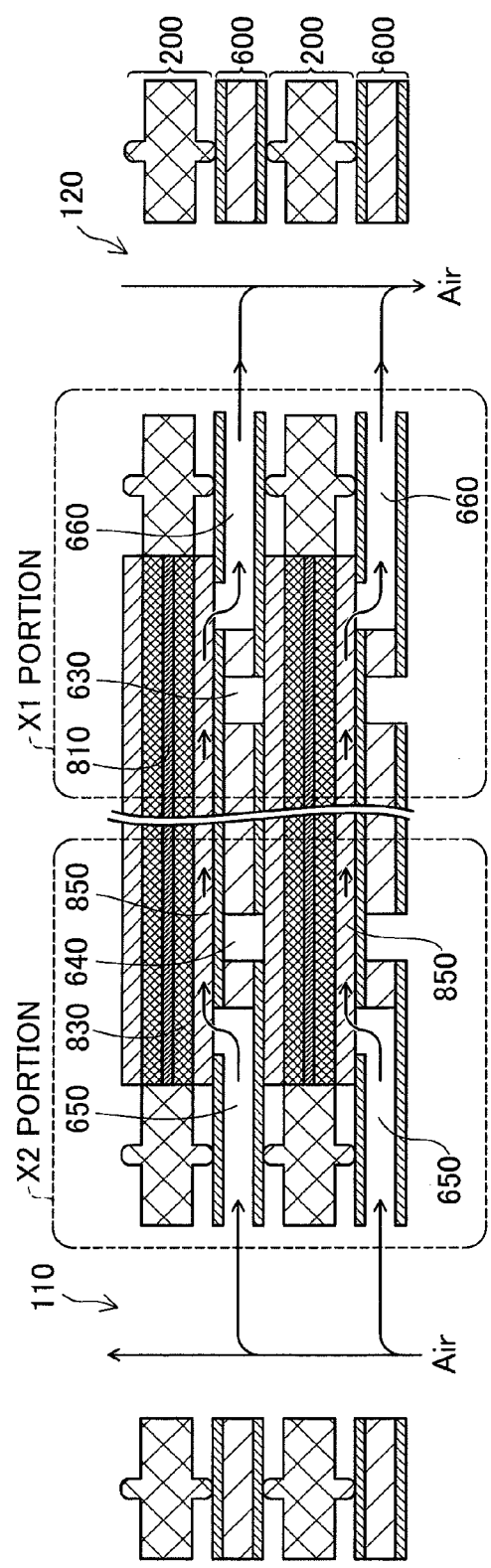
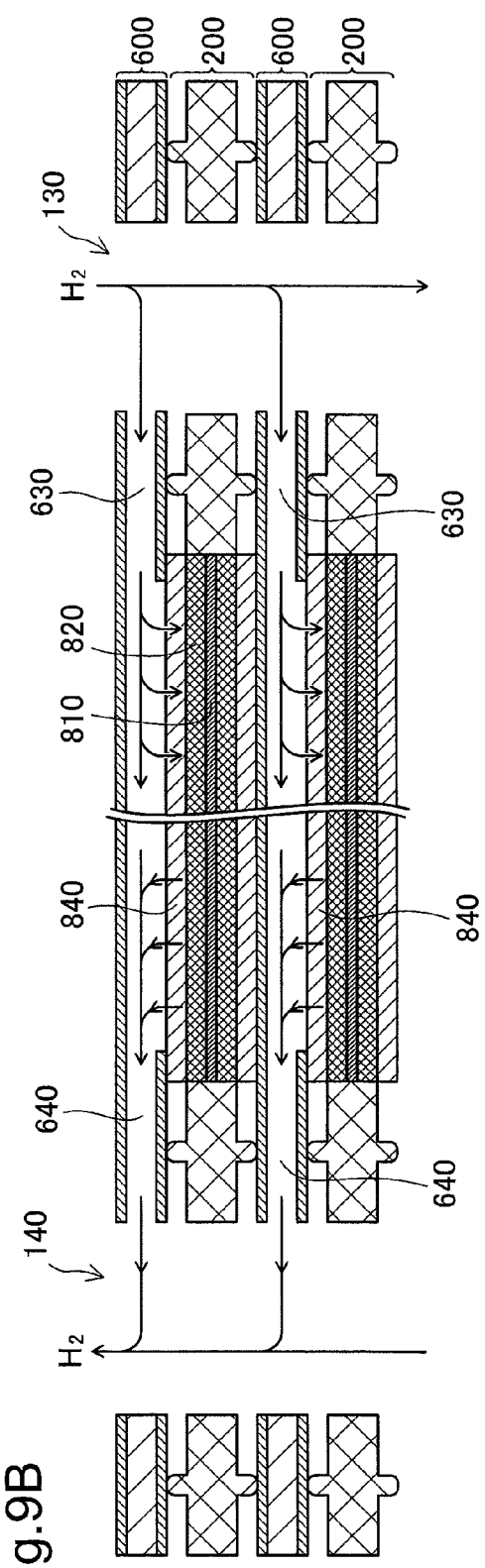
Fig.9A
Fig.9B

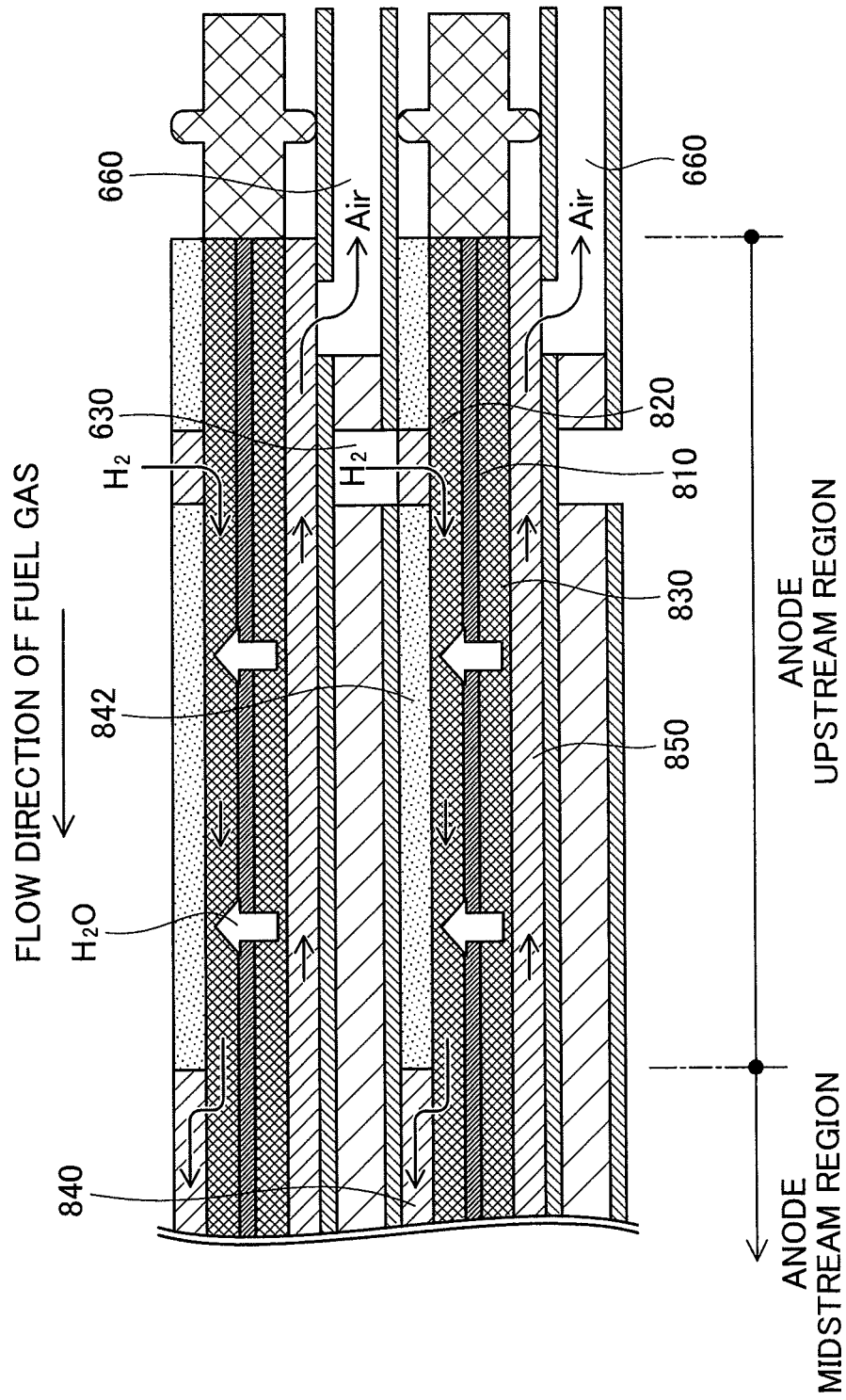

EMBODIMENT

COMPARATIVE EXAMPLE

EMBODIMENT

COMPARATIVE EXAMPLE

EMBODIMENT

COMPARATIVE EXAMPLE

A1-A1 CROSS SECTION

B1-B1 CROSS SECTION

C1-C1 CROSS SECTION

CELL RESISTANCE (m Ω · cm²)

|  |  | ANODE UPSTREAM REGION | | | |
|---|---|---|---|---|---|
|  |  | 0 | 1/6 | 1/4 | 1/3 |
| ANODE DOWNSTREAM REGION | 0 | ∞ (=UNABLE TO GENERATE POWER DUE TO HIGH RESISTANCE) |  |  | 48 |
|  | 1/30 |  |  | 40 | 40 |
|  | 1/12 |  |  | 40 |  |
|  | 1/6 | 48 | 40 |  | 40 |

⇦ FLOW OF OXIDIZING GAS

⬅ FLOW OF FUEL GAS

FUEL CELL

CROSS REFERENCE TO RELATED APPLICATIONS

This application is a National Stage of International Application No. PCT/JP2010/003437 filed May 21, 2010, claiming priority based on International Patent Application No. PCT/JP2009/006052, filed Nov. 12, 2009, the contents of all of which are incorporated herein by reference in their entirety.

BACKGROUND

1. Technical Field

The present invention relates to a fuel cell, and more specifically to a fuel cell having the flow direction of a fuel gas opposed to the flow direction of an oxidizing gas.

2. Background Art

In a fuel cell, for example, polymer electrolyte fuel cell, reactive gases (fuel gas and oxidizing gas) are respectively supplied to a pair of electrodes (anode and cathode) disposed across an electrolyte membrane to cause electrochemical reactions, so that chemical energy of the matter is directly converted to electrical energy.

Drying the fuel cell lowers the ion conductivity of the electrolyte membrane and thereby degrades the power generation performance. In order to prevent such degradation of the power generation performance of the fuel cell, the reactive gases may be humidified with a humidifier, before being supplied to the fuel cell.

A fuel cell having the flow direction of the fuel gas opposed to the flow direction of the oxidizing gas (counter-flow type fuel cell) is known as the fuel cell that can prevent drying-induced degradation of the power generation performance without using a humidifier. In the fuel cell having the flow direction of the fuel gas opposed to the flow direction of the oxidizing gas, the downstream region along the flow direction of the oxidizing gas on the cathode side faces the upstream region along the flow direction of the fuel gas on the anode side. Water (water vapor) generated by the electrochemical reaction on the cathode is thus transferred from the downstream region along the flow direction of the oxidizing gas on the cathode side to the upstream region along the flow direction of the fuel gas on the anode side. Further transfer of the water vapor on the fuel gas flow to the anode side protects the whole fuel cell from drying and accordingly prevents degradation of the power generation performance.

JP 2008-98181A
JP 2009-4230A
JP 2005-251699A
WO 2006/43394A

SUMMARY

In the prior art fuel cell described above, however, the water vapor transferred to the upstream region along the flow direction of the fuel gas on the anode side may be immediately returned to the cathode side or may be discharged outside the fuel cell. There is a possibility that especially the downstream region along the flow direction of the fuel gas on the anode side (i.e., the upstream region along the flow direction of the oxidizing gas on the cathode side) is not sufficiently protected from drying, which may result in degradation of the power generation performance.

Consequently, in order to address the problem described above, there is a need to effectively prevent drying-induced degradation of power generation performance in a fuel cell having the flow direction of fuel gas opposed to the flow direction of oxidizing gas.

In order to achieve at least part of the foregoing, the present invention provides various aspects and embodiments described below.

First aspect: According to a first aspect of the invention, there is provided a fuel cell, comprising: a power generation layer including an electrolyte membrane, and an anode and a cathode provided on respective surfaces of the electrolyte membrane; a fuel gas flow path layer located on a side of the anode of the power generation layer to supply a fuel gas to the anode while flowing the fuel gas along a flow direction of the fuel gas approximately orthogonal to a stacking direction in which respective layers of the fuel cell are stacked; and an oxidizing gas flow path layer located on a side of the cathode of the power generation layer to supply an oxidizing gas to the cathode while flowing the oxidizing gas along a flow direction of the oxidizing gas opposed to the flow direction of the fuel gas, wherein a power generation area of the fuel cell, in which electric power is generated, has an upstream region including a most upstream position along the flow direction of the fuel gas and a downstream region including a most downstream position along the flow direction of the fuel gas, and wherein a midstream region, which is a remaining region of the power generation area other than the upstream region and the downstream region, has higher water vapor transfer resistance between the anode side and the cathode side than the upstream region and the downstream region.

In the fuel cell according to the first aspect, the flow direction of the fuel gas in the fuel gas flow path layer and the flow direction of the oxidizing gas in the oxidizing gas flow path layer have opposed relationship. The midstream region of the power generation area has higher water vapor transfer resistance between the anode side and the cathode side, compared with the upstream region and the downstream region of the power generation area along the flow direction of the fuel gas. In this fuel cell, a relatively large amount of water vapor is transferred from the cathode side to the anode side in the upstream region. While the transfer of water vapor from the anode side to the cathode side is suppressed in the midstream region, a relatively large amount of water vapor reaches the downstream region on the anode side and is transferred to the cathode side. Accordingly, this fuel cell sufficiently protects the whole power generation area including the downstream region from drying and effectively prevents drying-induced degradation of the power generation performance.

Second aspect: In the fuel cell according to the first aspect, the fuel cell further comprises an anode diffusion layer located between the anode and the fuel gas flow path layer, wherein the fuel gas flow path layer is provided, such that the upstream region and the downstream region have higher gas flow resistance than the midstream region.

In the fuel cell according to the second aspect, the upstream region and the downstream region have the higher gas flow resistance of the fuel gas flow path layer than the gas flow resistance in the midstream region. While the fuel gas accordingly flows through the fuel gas flow path layer along the flow direction of the fuel gas in the midstream region, at least part of the fuel gas flows through the anode diffusion layer along the flow direction of the fuel gas in the upstream region and in the downstream region. In this fuel cell, the midstream region accordingly has the higher water vapor transfer resistance between the anode side and the cathode side than the water vapor transfer resistance in the upstream region and in the downstream region.

Third aspect: In the fuel cell according to the second aspect, a blocking portion, in which a gas flow path is blocked, is provided in the fuel gas flow path layer in the upstream region and in the downstream region.

In the fuel cell according to the third aspect, the blocking portion, in which the gas flow path is blocked, is provided in the fuel gas flow path layer in the upstream region and in the downstream region. This structure causes the gas flow resistance of the fuel gas flow path layer in the upstream region and in the downstream region to be higher than the gas flow resistance in the midstream region.

Fourth aspect: In the fuel cell according to the first aspect, the fuel cell further comprises an anode diffusion layer located between the anode and the fuel gas flow path layer, wherein the anode diffusion layer is provided, such that the midstream region has higher diffusion resistance than the upstream region and the downstream region.

In the fuel cell according to the fourth aspect, the midstream region has the higher diffusion resistance of the anode diffusion layer than the diffusion resistance in the upstream region and in the downstream region. This structure causes the midstream region to have the higher water vapor transfer resistance between the anode side and the cathode side than the water vapor transfer resistance in the upstream region and in the downstream region.

Fifth aspect: In the fuel cell according to the fourth aspect, the anode diffusion layer is provided, such that the midstream region has higher density than the upstream region and the downstream region.

In the fuel cell according to the fifth aspect, the midstream region has the higher density of the anode diffusion layer than the density in the upstream region and in the downstream region. This structure causes the midstream region to have the higher diffusion resistance of the anode diffusion layer than the diffusion resistance in the upstream region and in the downstream region.

Sixth aspect: In the fuel cell according to the fourth aspect, the anode diffusion layer is provided, such that the midstream region has greater thickness than the upstream region and the downstream region.

In the fuel cell according to the sixth aspect, the thickness of the anode diffusion layer in the midstream region is greater than the thickness of the anode diffusion layer in the upstream region and in the downstream region. This structure causes the midstream region to have the higher diffusion resistance of the anode diffusion layer than the diffusion resistance in the upstream region and in the downstream region.

Seventh aspect: In the fuel cell according to the first aspect, the anode is provided, such that the midstream region has higher ratio of amount of ionomer to amount of catalyst-support carbon than the upstream region and the downstream region.

In the fuel cell according to the seventh aspect, the midstream region has the higher ratio of the amount of ionomer to the amount of catalyst-support carbon of the anode than the ratio in the upstream region and in the downstream region. This structure causes the midstream region to have the higher water vapor transfer resistance between the anode side and the cathode side than the water vapor transfer resistance in the upstream region and in the downstream region.

Eighth aspect: In the fuel cell according to the first aspect, the anode is provided, such that the midstream region has greater thickness than the upstream region and the downstream region.

In the fuel cell according to the eighth aspect, the thickness of the anode in the midstream region is greater than the thickness of the anode in the upstream region and in the downstream region. This structure causes the midstream region to have the higher water vapor transfer resistance between the anode side and the cathode side than the water vapor transfer resistance in the upstream region and in the downstream region.

Ninth aspect: In the fuel cell according to the first aspect, the electrolyte membrane is provided, such that the midstream region has lower ion exchange capacity than the upstream region and the downstream region.

In the fuel cell according to the ninth aspect, the midstream region has the lower ion exchange capacity of the electrolyte membrane than the ion exchange capacity in the upstream region and in the downstream region. This structure causes the midstream region to have the higher water vapor transfer resistance between the anode side and the cathode side than the water vapor transfer resistance in the upstream region and in the downstream region.

Tenth aspect: In the fuel cell according to the first aspect, the fuel cell further comprises an anode diffusion layer located between the anode and the fuel gas flow path layer, wherein the anode diffusion layer is compressed in the midstream region, so that thickness of the anode diffusion layer in the midstream region is less than thickness of the anode diffusion layer in the upstream region and the downstream region, and the anode is provided, such that the midstream region has greater thickness than the upstream region and the downstream region.

In the fuel cell according to the tenth aspect, the anode diffusion layer is compressed in the midstream region, so that the midstream region has the higher diffusion resistance of the anode diffusion layer than the diffusion resistance of the anode diffusion layer in the upstream region and in the downstream region. The midstream region accordingly has the higher water vapor transfer resistance between the anode side and the cathode side than the water vapor transfer resistance in the upstream region and in the downstream region. In this fuel cell, the thickness of the anode in the midstream region is greater than the thickness of the anode in the upstream region and in the downstream region. This further increases the water vapor transfer resistance between the anode side and the cathode side in the midstream region to be higher than the water vapor transfer resistance in the upstream region and in the downstream region. Accordingly, this fuel cell sufficiently protects the whole power generation area including the downstream region from drying and effectively prevents drying-induced degradation of the power generation performance. Additionally, in this fuel cell, the thickness of the anode in the midstream region is greater than the thickness of the anode in the upstream region and the downstream region, whilst the thickness of the anode diffusion layer in the midstream region is less than the thickness of the anode diffusion layer in the upstream region and in the downstream region. This prevents the electrical properties and the drainage performance of the fuel cell from being worsened and prevents the manufacturing process from being complicated.

Eleventh aspect: In the fuel cell according to the third aspect, the oxidizing gas flow path layer includes a water accumulating portion, which is provided in the upstream region of the fuel cell to facilitate acceleration of water.

In the fuel cell according to the eleventh aspect, the oxidizing gas flow path layer is located in the upstream region of the fuel cell and has the water accumulating portion to facilitate accumulation of water. This prevents deficiency of water on the cathode side in the upstream region and ensures transfer of water from the cathode side to the anode side with high efficiency. Accordingly, this fuel cell sufficiently protects the whole power generation area including the downstream region from drying and effectively prevents drying-induced degradation of the power generation performance.

Twelfth aspect: In the fuel cell according to the first aspect, the fuel gas flow path layer has a blocked flow path including blockage of fuel gas flow along the flow direction of the fuel gas in the upstream region and in the downstream region of the fuel cell, and a linear flow path without blockage of the fuel gas flow along the flow direction of the fuel gas in the midstream region of the fuel cell.

In the fuel cell according to the twelfth aspect, in the upstream region and in the downstream region of the fuel cell, the fuel gas flow path layer has the blocked flow path including blockage of the fuel gas flow along the flow direction of the fuel gas. This facilitates the flow of the fuel gas from the fuel gas flow path layer to the power generation layer in the upstream region and in the downstream region. In the midstream region of the fuel cell, on the other hand, the fuel gas flow path layer has the linear flow path without blockage of the fuel gas flow along the flow direction of the fuel gas. This does not facilitate the flow of the fuel gas from the fuel gas flow path layer to the power generation layer in the midstream region. In this fuel cell, the midstream region has the higher water vapor transfer resistance between the anode side and the cathode side than the water vapor transfer resistance in the upstream region and in the downstream region. Accordingly, this fuel cell sufficiently protects the whole power generation area including the downstream region from drying and effectively prevents drying-induced degradation of the power generation performance.

Thirteenth aspect: In the fuel cell according to any one of the first aspect through the twelfth aspect, the midstream region includes a center position of the power generation area along the flow direction of the fuel gas.

The present invention may be implemented by diversity of aspects, for example, a fuel cell and a fuel cell system.

BRIEF DESCRIPTION OF THE DRAWINGS

FIG. 8 is a front view of a separator 600;

FIG. 9A and FIG. 9B illustrate the flows of reactive gases in the fuel cell 100;

FIG. 10 is a sectional view of the fuel cell 100;

DESCRIPTION OF THE EMBODIMENT

The embodiments of the present invention are described below.

A. First Embodiment

Figure 1:
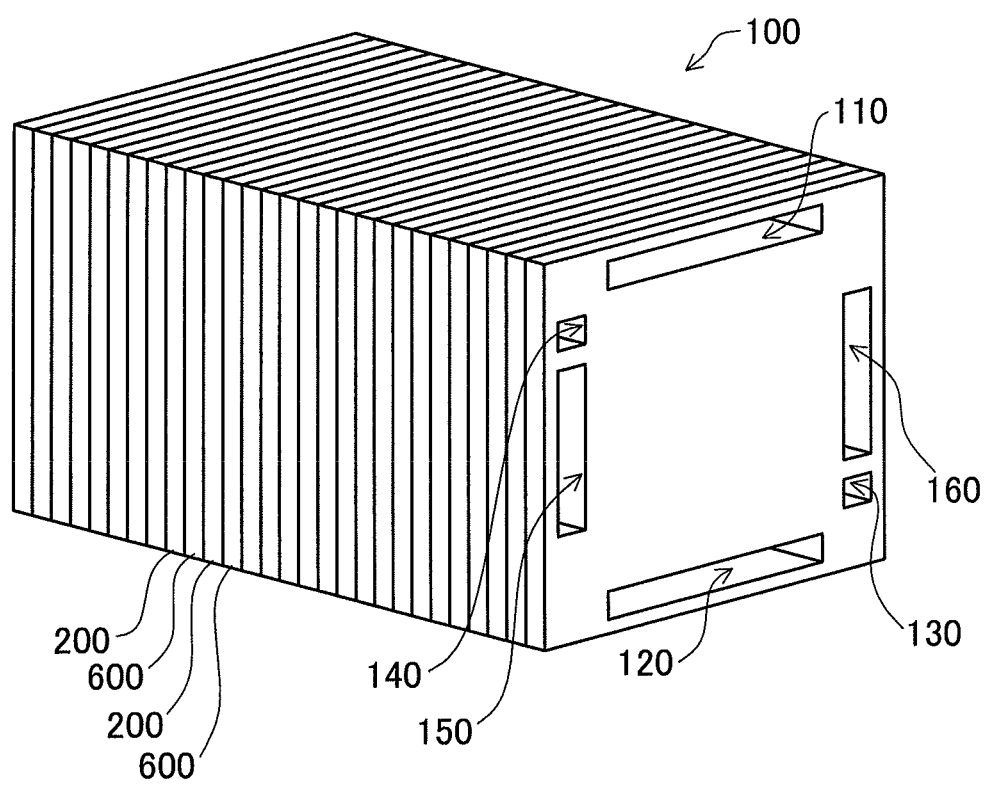
FIG. 1 schematically illustrates the structure of a fuel cell according to a first embodiment.
Figure 2:
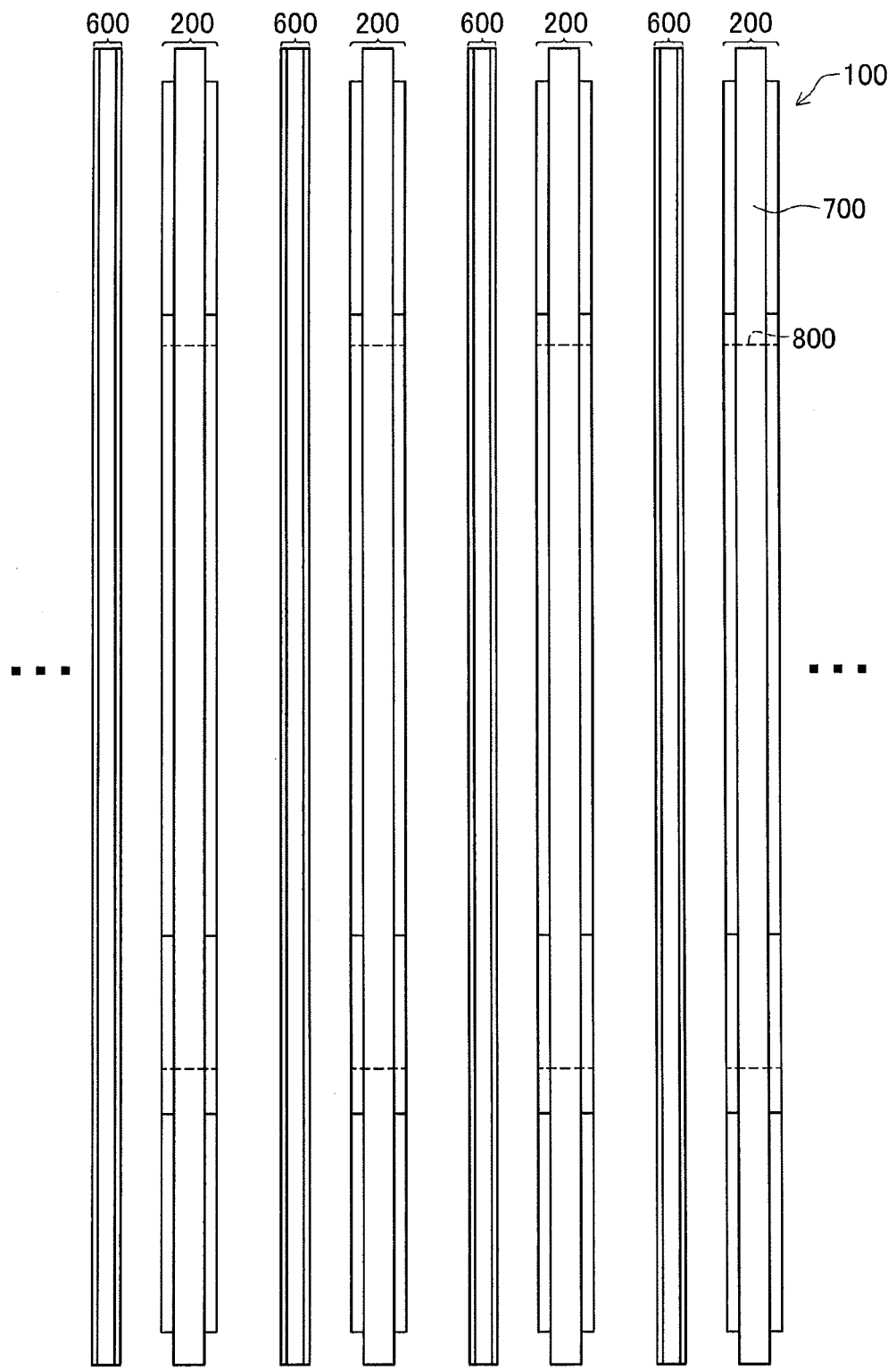
FIG. 2 schematically illustrates the structure of the fuel cell according to the first embodiment.

FIGS. 1 and 2 schematically illustrate the structure of a fuel cell according to a first embodiment. As shown in FIGS. 1 and 2, the fuel cell 100 of this embodiment has a stack structure in which power generation modules 200 and separators 600 are stacked alternately. For the better understanding of the stack structure, only part of the plurality of power generation modules 200 and separators 600 included in the fuel cell 100 are representatively illustrated in FIG. 2.

Referring to FIG. 1, the fuel cell 100 includes an oxidizing gas supply manifold 110 for supplying an oxidizing gas, an oxidizing gas exhaust manifold 120 for exhausting the oxidizing gas, a fuel gas supply manifold 130 for supplying a fuel gas, a fuel gas exhaust manifold 140 for exhausting the fuel gas, a cooling medium supply manifold 150 for supplying a cooling medium and a cooling medium discharge manifold 160 for discharging the cooling medium. The oxidizing gas may be, for example, the air and the fuel gas may be, for example, hydrogen gas. The oxidizing gas and the fuel gas may also be called reactive gas. Typical examples of the cooling medium include water, antifreeze fluids like ethylene glycol, and the air.

Figure 3:
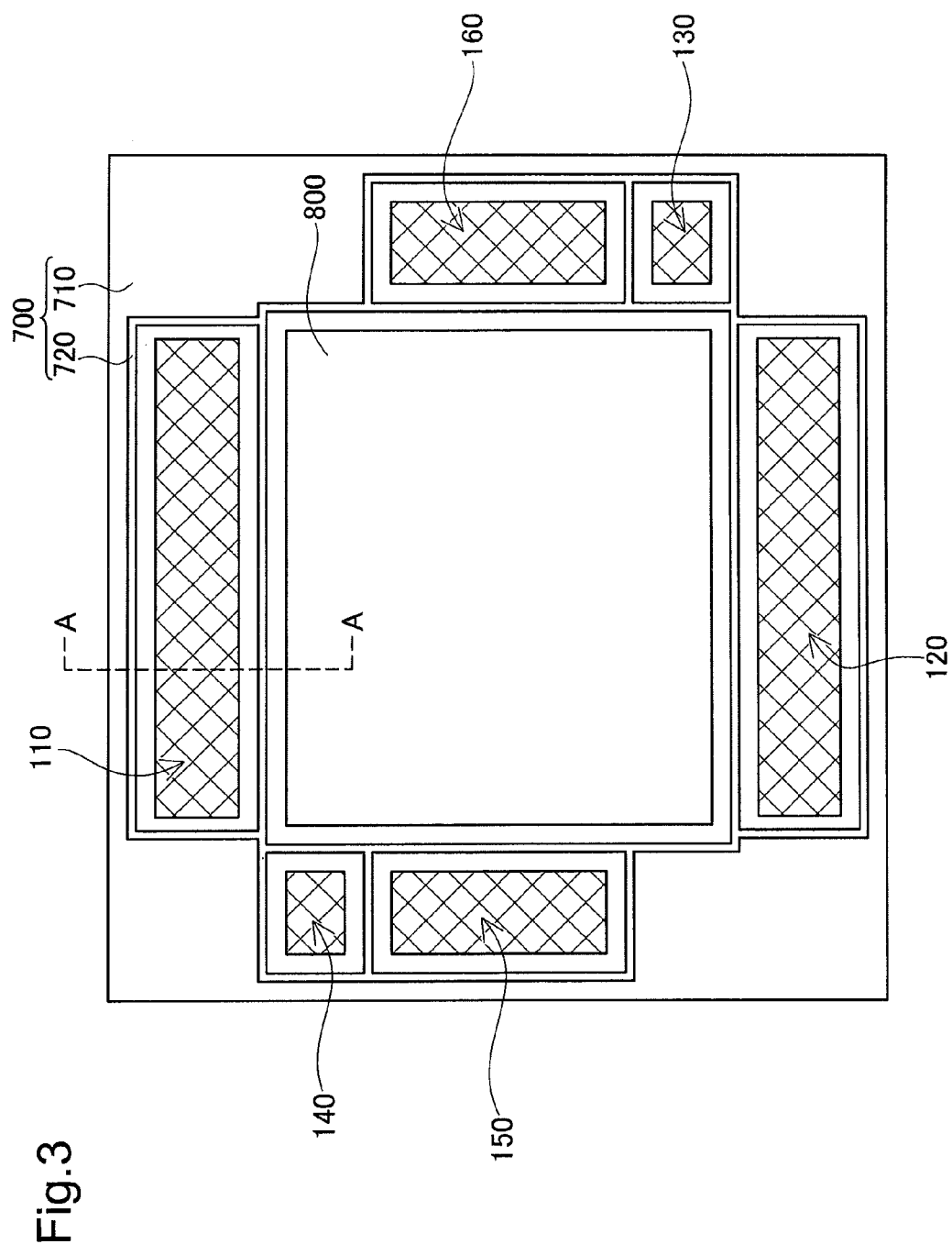
FIG. 3 is a front view of a power generation module 200.
Figure 4:
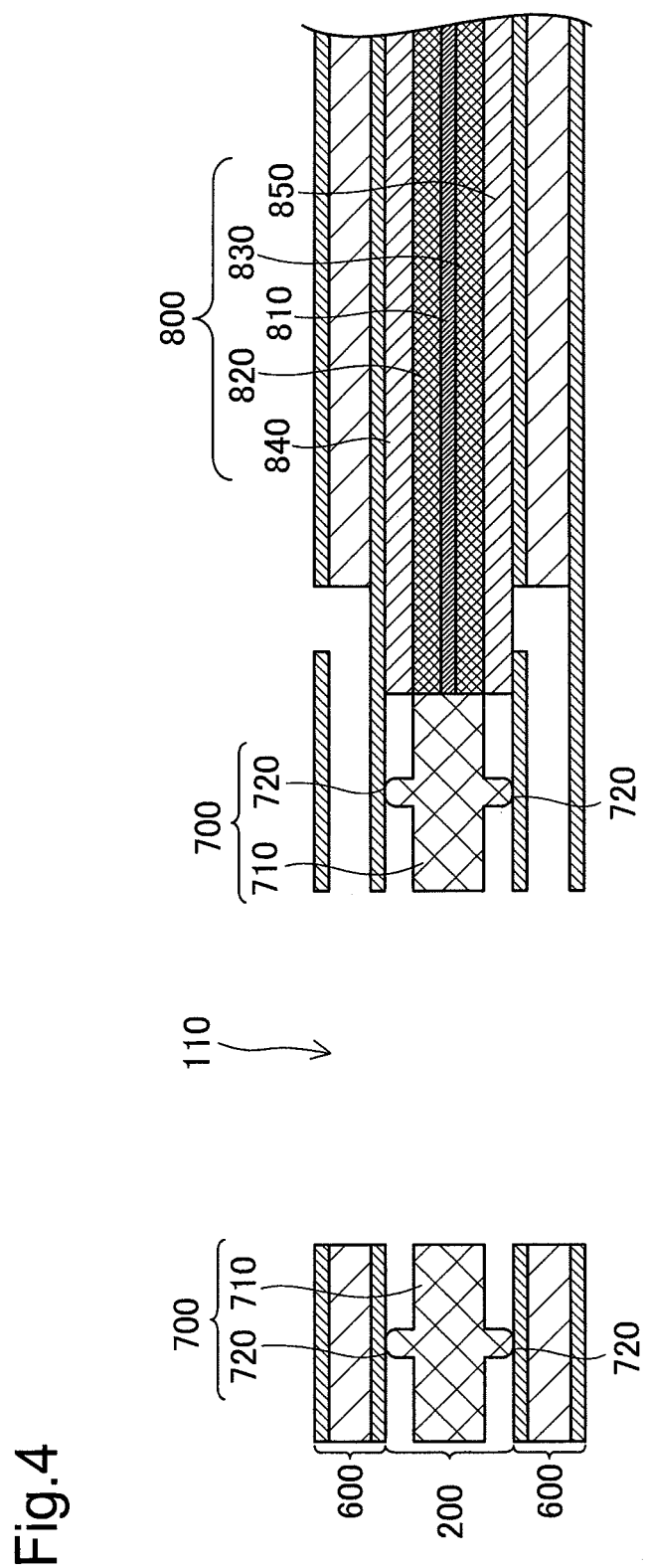
FIG. 4 is a sectional view showing an A-A cross section of FIG. 3.

FIG. 3 is a front view of the power generation module 200 (seen from the right side of FIG. 2). FIG. 4 is a sectional view showing an A-A cross section of FIG. 3. One of the power generation modules 200 and a pair of separators 600 located across the power generation module 200 are shown in FIG. 4.

The power generation module 200 includes a stacked assembly 800 and a seal member 700. The stacked assembly 800 includes a power generation layer 810, an anode diffusion layer 820, a cathode diffusion layer 830, an anode-side porous flow path layer 840 and a cathode-side porous flow path layer 850 as shown in FIG. 4. The respective layers 810 through 850 constituting the stacked assembly 800 are substantially rectangular plate members.

The power generation layer 810 is an ion exchange membrane having a cathode catalyst layer formed on one surface and an anode catalyst layer formed on the other surface (catalyst layers are not specifically illustrated). The power generation layer 810 is also called membrane electrode assembly or MEA. The ion exchange membrane is made of a fluororesin material or a hydrocarbon resin material and has good ion conductivity in the wet state. The catalyst layer may contain, for example, platinum or an alloy of platinum and another metal as the catalyst.

The anode diffusion layer 820 is provided adjoining to the anode surface of the power generation layer 810, whilst the cathode diffusion layer 830 is provided adjoining to the cathode surface of the power generation layer 810. The anode diffusion layer 820 and the cathode diffusion layer 830 may be made of carbon cloth of woven carbon fiber, carbon paper or carbon felt.

The anode-side porous flow path layer 840 is provided opposite to the anode surface of the power generation layer 810 across the anode diffusion layer 820, whilst the cathode-side porous flow path layer 850 is provided opposite to the cathode surface of the power generation layer 810 across the cathode diffusion layer 830. The cathode-side porous flow path layer 850 adjoins the surface of one separator 600 located on the cathode side, while the anode-side porous flow path layer 840 adjoins the surface of another separator 600 located on the anode side. The anode-side porous flow path layer 840 and the cathode-side porous flow path layer 850 are made of a porous material having gas diffusivity and electrical conductivity, such as a porous metal. The anode-side porous flow path layer 840 and the cathode-side porous flow path layer 850 have the higher porosity than the anode diffusion layer 820 and the cathode diffusion layer 830 and the lower internal gas flow resistance than the anode diffusion layer 820 and the cathode diffusion layer 830 and serve as the flow paths for the reactive gases as discussed later. The anode-side porous flow path layer 840 and the cathode-side porous flow path layer 850 respectively correspond to the fuel gas flow path layer and the oxidizing gas flow path layer according to the invention.

As shown in FIG. 3, the seal member 700 is provided around the whole circumference of the stacked assembly 800 in the planar direction. The seal member 700 is produced by injection molding a molding material around the exposed outer circumference of the stacked assembly 800 placed in a mold cavity, such that the seal member 700 is closely and air-tightly integrated with the outer circumference of the stacked assembly 800. The seal member 700 is made of a material having gas impermeability, elasticity and heat resistance in the operating temperature range of the fuel cell, for example, rubber or elastomer. Typical examples of the material include silicon rubber, butyl rubber, acrylic rubber, natural rubber, fluorinated rubber, ethylene-propylene rubber, styrene elastomer and fluorinated elastomer.

The seal member 700 includes a support base 710 and ribs 720 provided on both surfaces of the support base 710 to form seal lines. As shown in FIGS. 3 and 4, the support base 710 has through-holes (manifold holes) formed corresponding to the respective manifolds 110 to 160 shown in FIG. 1. As shown in FIG. 4, each of the ribs 720 is in close contact with the adjoining separator 600 to seal against the separator 600 and thereby prevent leakage of the reactive gas (hydrogen or the air in this embodiment) or cooling water. The ribs 720 form seal lines surrounding the whole circumference of the stacked assembly 800 and seal lines surrounding the whole circumferences of the respective manifold holes as shown in FIG. 3.

Figure 5:
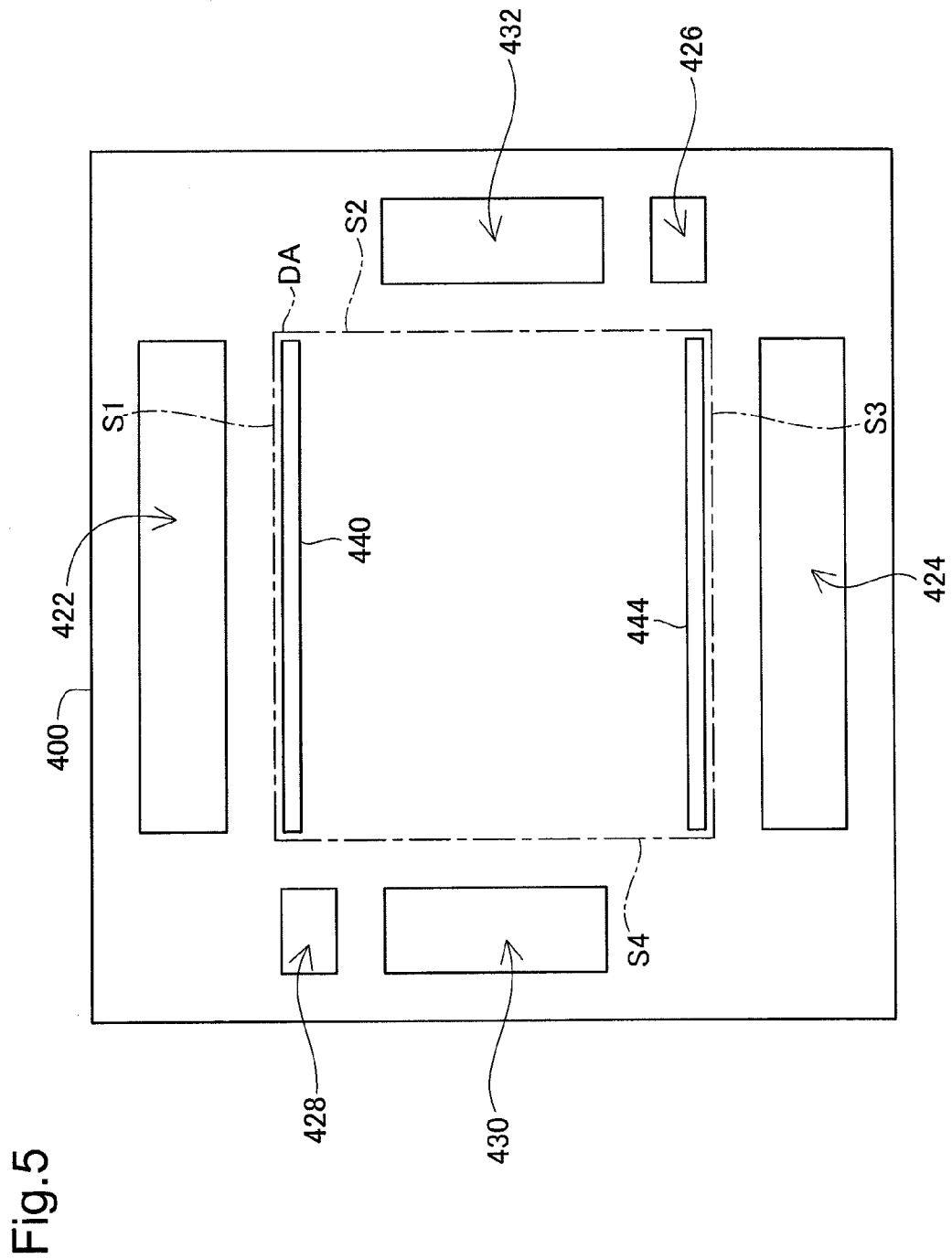
FIG. 5 illustrates the shape of a cathode plate 400.
Figure 6:
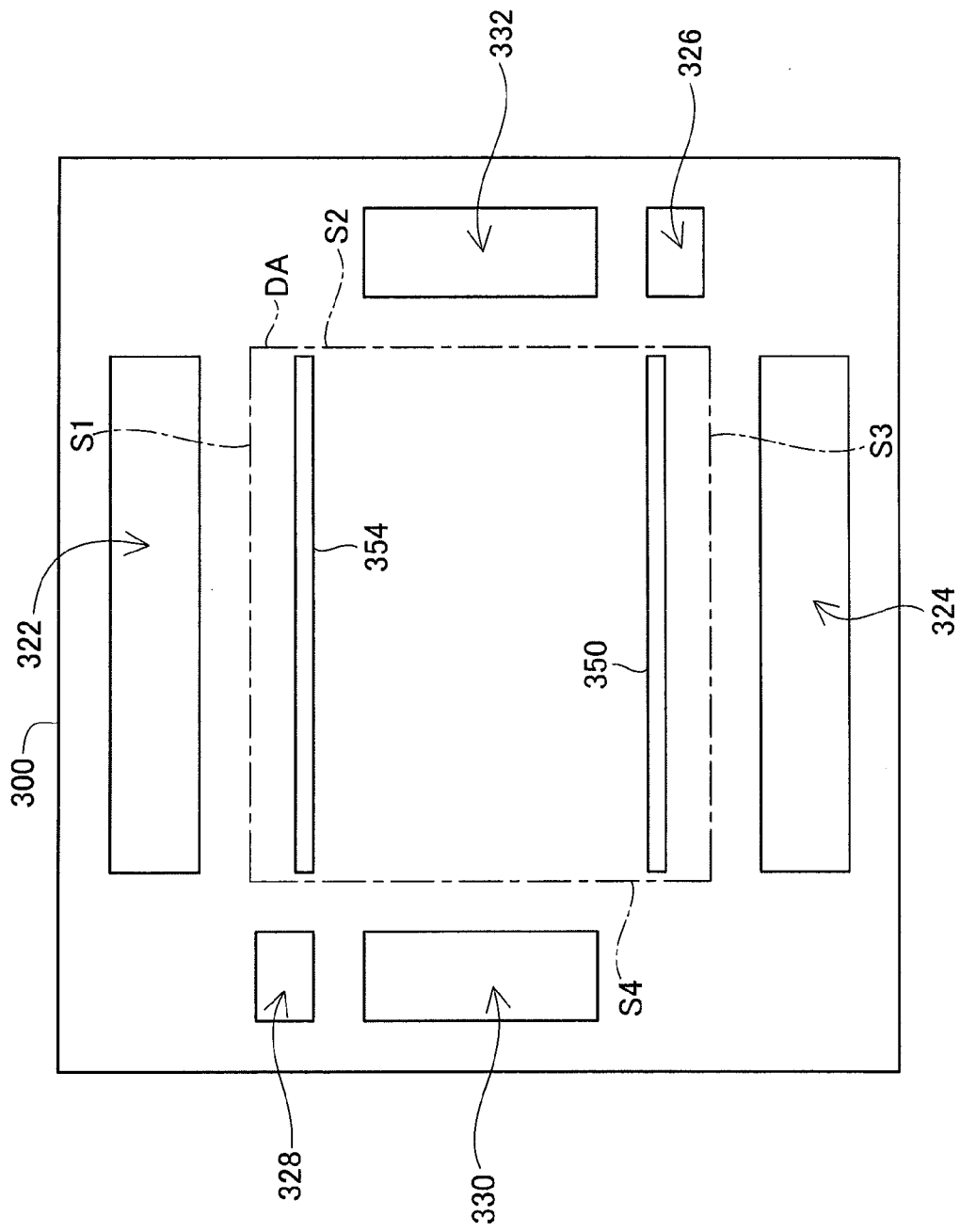
FIG. 6 illustrates the shape of an anode plate 300.
Figure 7:
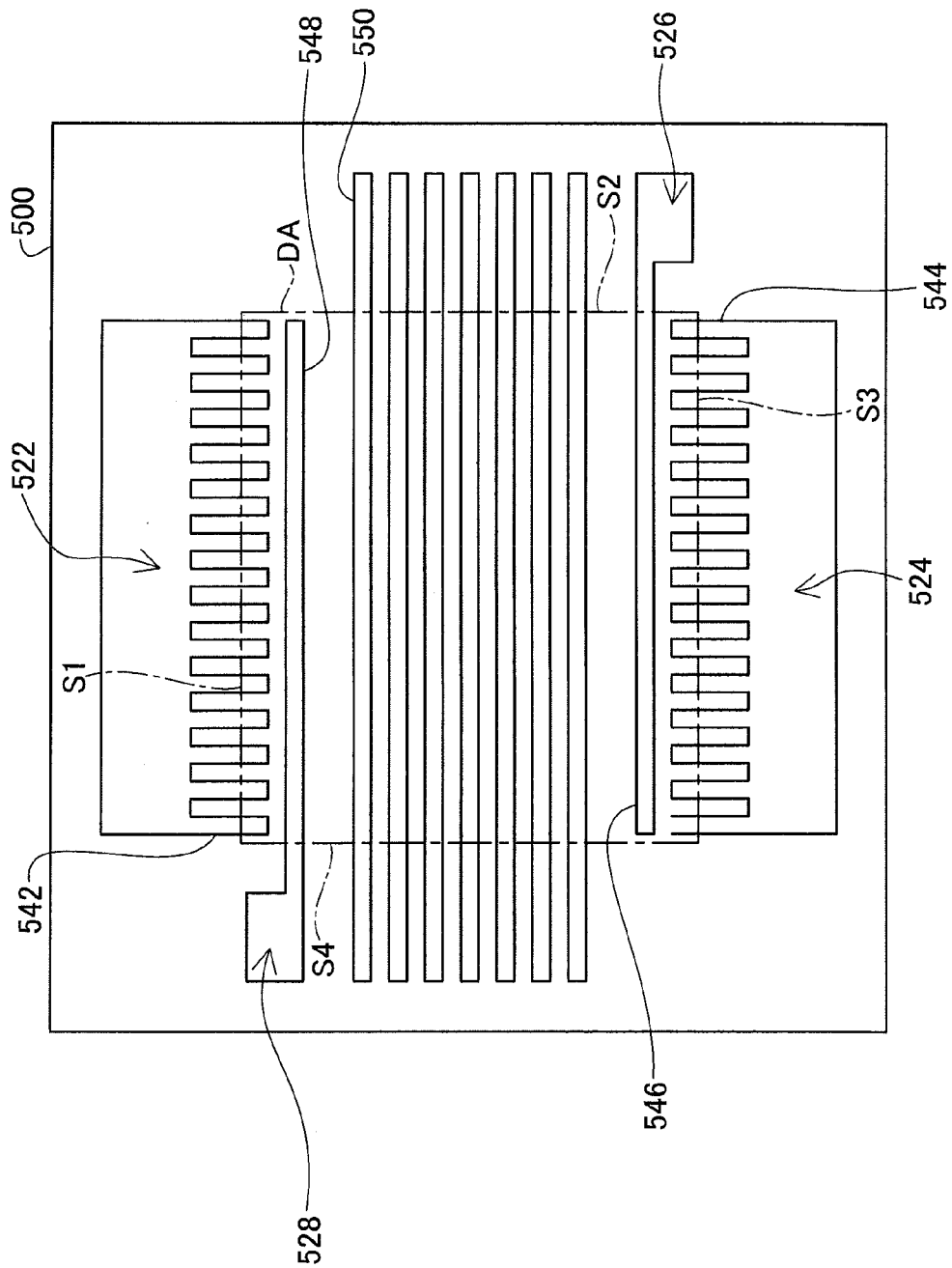
FIG. 7 illustrates the shape of a middle plate 500.

The separator 600 of the embodiment includes an anode plate 300, a cathode plate 400 and a middle plate 500. FIG. 5 illustrates the shape of the cathode plate 400, FIG. 6 illustrates the shape of the anode plate 300 and FIG. 7 illustrates the shape of the middle plate 500. FIGS. 5 through 7 are views of the respective plates 400, 300 and 500 seen from the right side of FIG. 2. FIG. 8 is a front view of the separator 600. In FIGS. 5 to 8, an area defined by the one-dot chain line in the center regions of the respective plates 300, 400 and 500 and the separator 600 show an area in which electric power is actually generated (hereinafter called "power generation area DA"). In the fuel cell 100 of this embodiment, the power generation area DA corresponds to the area in which the power generation layer 810 of the stacked assembly 800 is located. Since the power generation layer 810 is formed in substantially rectangular shape, the power generation area DA also has substantially rectangular shape.

In the description below, the upper side of the power generation area DA (i.e., side close to the oxidizing gas supply manifold 110) shown in FIGS. 5 to 8 is called first side S1. Similarly, the right side (i.e., side close to the cooling medium discharge manifold 160), the lower side (i.e., side close to the oxidizing gas exhaust manifold 120) and the left side (i.e., side close to the cooling medium supply manifold 150) are respectively called second side S2, third side S3 and fourth side S4.

The cathode plate 400 (FIG. 5) may be made of, for example, stainless steel. The cathode plate 400 has six manifold-forming apertures 422, 424, 426, 428, 430 and 432 formed as through-holes passing through the cathode plate 400 in the thickness direction, an oxidizing gas supply slit 440 and an oxidizing gas exhaust slit 444. The manifold-forming apertures 422 to 432 are penetration holes for forming the respective manifolds 110 to 160 described above and are provided outside the power generation area DA. The oxidizing gas supply slit 440 is formed as a substantially rectangular long hole and is provided along substantially the whole length of the first side S1 inside the power generation area DA. The oxidizing gas exhaust slit 444 is formed as a substantially rectangular long hole similarly to the oxidizing gas supply slit 440 and is provided along substantially the whole length of the third side S3 inside the power generation area DA.

The anode plate 300 (FIG. 6) may be made of, for example, stainless steel, like the cathode plate 400. The anode plate 300 has six manifold-forming apertures 322, 324, 326, 328, 330 and 332 formed as through-holes passing through the anode plate 300 in the thickness direction, a fuel gas supply slit 350 and a fuel gas exhaust slit 354. The manifold-forming apertures 322 to 332 are penetration holes for forming the respective manifolds 110 to 160 described above and are provided outside the power generation area DA. The fuel gas supply slit 350 is provided along the third side S3 inside the power generation area DA, such as not to overlap with the oxidizing gas exhaust slit 444 of the cathode plate 400 in the stacking direction. The fuel gas exhaust slit 354 is provided along the first side S1 inside the power generation area DA, such as not to overlap with the oxidizing gas supply slit 440 of the cathode plate 400 in the stacking direction.

The middle plate 500 (FIG. 7) may be made of, for example, stainless steel, like the above plates 300 and 400. The middle plate 500 has four manifold-forming apertures 522, 524, 526 and 528 for supplying/exhausting the reactive gas (oxidizing gas or fuel gas) formed as through-holes passing through the middle plate 500 in the thickness direction, a plurality of oxidizing gas supply flow path-forming elements 542, a plurality of oxidizing gas exhaust flow path-forming elements 544, one fuel gas supply flow path-forming element 546, one fuel gas exhaust flow path-forming element 548 and a plurality of cooling medium flow path-forming elements 550. The manifold-forming apertures 522 to 528 are penetration holes for forming the respective manifolds 110 to 140 described above and are provided outside the power generation area DA. Each of the cooling medium flow path-forming elements 550 is formed as a long hole crossing the power generation area DA in the horizontal direction of FIG. 7 (i.e., the direction parallel to the first side S1) and has both ends extended beyond the power generation area DA. In other words, the cooling medium flow path-forming elements 550 are provided to cross the second side S2 and the fourth side S4 of the power generation area DA. The cooling medium flow path-forming elements 550 are arranged at preset intervals in the vertical direction of FIG. 8 (i.e., the direction parallel to the second side S2).

In the middle plate 500, respective one ends of the plurality of oxidizing gas supply flow path-forming elements 542 are connected with the manifold-forming aperture 522, such that the plurality of oxidizing gas supply flow path-forming elements 542 and the manifold-forming aperture 522 form a comb-like through-hole as a whole. Respective other ends of the plurality of oxidizing gas supply flow path-forming elements 542 are extended to the position overlapping with the oxidizing gas supply slit 440 of the cathode plate 400 in the stacking direction. In the assembled separator 600, the respective oxidizing gas supply flow path-forming elements 542 accordingly communicate with the oxidizing gas supply slit 440.

In the middle plate 500, respective one ends of the plurality of oxidizing gas exhaust flow path-forming elements 544 are connected with the manifold-forming aperture 524, such that the plurality of oxidizing gas exhaust flow path-forming elements 544 and the manifold-forming aperture 524 form a comb-like through-hole as a whole. Respective other ends of the plurality of oxidizing gas exhaust flow path-forming elements 544 are extended to the position overlapping with the oxidizing gas exhaust slit 444 of the cathode plate 400 in the stacking direction. In the assembled separator 600, the respective oxidizing gas exhaust flow path-forming elements 544 accordingly communicate with the oxidizing gas exhaust slit 444.

In the middle plate 500, one end of the fuel gas supply flow path-forming element 546 is connected with the manifold-forming aperture 526. The fuel gas supply flow path-forming element 546 crosses the second side S2 and is extended along the third side S3 in such a manner as not to overlap with the oxidizing gas exhaust flow path-forming elements 544 described above. The other end of the fuel gas supply flow path-forming element 546 reaches near the fourth side S4 of the power generation area DA. This means that the fuel gas supply flow path-forming element 546 is extended over substantially the whole length of the third side S3. An inside portion of the fuel gas supply flow path-forming element 546 inside the power generation area DA overlaps with the fuel gas supply slit 350 of the anode plate 300 in the stacking direction. In the assembled separator 600, the fuel gas supply flow path-forming element 546 accordingly communicates with the fuel gas supply slit 350.

In the middle plate 500, one end of the fuel gas exhaust flow path-forming element 548 is connected with the manifold-forming aperture 528. The fuel gas exhaust flow path-forming element 548 crosses the fourth end S4 and is extended along the first side S1 in such a manner as not to overlap with the oxidizing gas supply flow path-forming elements 542 described above. The other end of the fuel gas exhaust flow path-forming element 548 reaches near the second side S2 of the power generation area DA. This means that the fuel gas exhaust flow path-forming element 548 is extended over substantially the whole length of the first side S1. An inside portion of the fuel gas exhaust flow path-forming element 548 inside the power generation area DA overlaps with the fuel gas exhaust slit 354 of the anode plate 300 in the stacking direction. In the assembled separator 600, the fuel gas exhaust flow path-forming element 548 accordingly communicates with the fuel gas exhaust slit 354.

FIG. 8 shows the front view of the separator 600 assembled from the respective plates 300, 400 and 500 described above. The procedure of producing the separator 600 locates the middle plate 500 between the anode plate 300 and the cathode plate 400 and joins the anode plate 300 and the cathode plate 400 with the respective surfaces of the middle plate 500. The procedure then punches out exposed areas of the middle plate 500 at the positions corresponding to the cooling medium supply manifold 150 and the cooling medium discharge manifold 160. The three plates may be joined by, for example, thermocompression bonding, brazing or welding. The resulting separator 600 has the six manifolds 110 to 160 formed as the through-holes shown by the hatched areas in FIG. 8, a plurality of oxidizing gas supply flow paths 650, a plurality of oxidizing gas exhaust flow paths 660, a fuel gas supply flow path 630, a fuel gas exhaust flow path 640 and a plurality of cooling medium flow paths 670.

Referring to FIG. 8, the oxidizing gas supply manifold 110 is formed along the first side S1 and over the whole length of the first side S1 outside the power generation area DA. The oxidizing gas exhaust manifold 120 is formed along the third side S3 and over the whole length of the third side S3 outside the power generation area DA. The fuel gas supply manifold 130 is formed along a part of the second side S2 at the location close to the third side S3, and the cooling medium discharge manifold 160 is formed along the remaining part of the second side S2. The fuel gas exhaust manifold 140 is formed along a part of the fourth side S4 at the location close to the first side S1, and the cooling medium supply manifold 150 is formed along the remaining part of the fourth side S4.

As shown in FIG. 8, the plurality of oxidizing gas supply flow paths 650 are respectively formed by the oxidizing gas supply slit 440 of the cathode plate 400 and the respective oxidizing gas supply flow path-forming elements 542 of the middle plate 500 described above. Each of the oxidizing gas supply flow paths 650 is provided as an internal flow path going through inside the separator 600 and having one end communicating with the oxidizing gas supply manifold 110 and the other end open to the surface of the cathode plate 400 (cathode-side surface) of the separator 600. This opening corresponds to the oxidizing gas supply slit 440.

As also shown in FIG. 8, the plurality of oxidizing gas exhaust flow paths 660 are respectively formed by the oxidizing gas exhaust slit 444 of the cathode plate 400 and the respective oxidizing gas exhaust flow path-forming elements 544 of the middle plate 500 described above. Each of the oxidizing gas exhaust flow paths 660 is provided as an internal flow path going through inside the separator 600 and having one end communicating with the oxidizing gas exhaust manifold 120 and the other end open to the cathode-side surface of the separator 600. This opening corresponds to the oxidizing gas exhaust slit 444.

As further shown in FIG. 8, the fuel gas exhaust flow path 640 is formed by the fuel gas exhaust slit 354 of the anode plate 300 and the fuel gas exhaust flow path-forming element 548 of the middle plate 500 described above. The fuel gas exhaust flow path 640 is provided as an internal flow path having one end communicating with the fuel gas exhaust manifold 140 and the other end open to the surface of the anode plate 300 (anode-side surface) of the separator 600. This opening corresponds to the fuel gas exhaust slit 354.

As also shown in FIG. 8, the fuel gas supply flow path 630 is formed by the fuel gas supply slit 350 of the anode plate 300 and the fuel gas supply flow path-forming element 546 of the middle plate 500 described above. The fuel gas supply flow path 630 is provided as an internal flow path having one end communicating with the fuel gas supply manifold 130 and the other end open to the anode-side surface of the separator 600. This opening corresponds to the fuel gas supply slit 350.

As further shown in FIG. 8, the plurality of cooling medium flow paths 670 are formed by the cooling medium flow path-forming elements 550 of the middle plate 500 described above. Each of the cooling medium flow paths 670 has one end communicating with the cooling medium supply manifold 150 and the other end communicating with the cooling medium discharge manifold 160.

During power generation of the fuel cell 100, the cooling medium is supplied to the cooling medium supply manifold 150, in order to prevent a temperature increase of the fuel cell 100 due to heat evolution by power generation. The cooling medium supplied to the cooling medium supply manifold 150 goes from the cooling medium supply manifold 150 to the cooling medium flow path 670. The cooling medium supplied to the cooling medium flow path 670 flows from one end to the other end of the cooling medium flow path 670 and is discharged to the cooling medium discharge manifold 160.

FIG. 9A and FIG. 9B illustrate the flows of the reactive gases in the fuel cell 100. FIG. 9A shows a B-B cross section of FIG. 8. The right half of FIG. 9B shows a D-D cross section of FIG. 8, and the left half of FIG. 9B shows a C-C cross section of FIG. 8. The two power generation modules 200 and the two separators 600 included in the fuel cell 100 are shown in FIG. 9A and FIG. 9B.

Referring to FIG. 9A, the oxidizing gas (air) is supplied to the oxidizing gas supply manifold 110. As shown by the arrows in FIG. 9A, the oxidizing gas supplied to the oxidizing gas supply manifold 110 flows through the oxidizing gas supply flow path 650 and enters the cathode-side porous flow path layer 850 via the cathode-side surface opening of the oxidizing gas supply flow path 650. The oxidizing gas entering the cathode-side porous flow path layer 850 flows inside the cathode-side porous flow path layer 850 forming the oxidizing gas flow path in the direction from the oxidizing gas supply manifold 110 to the oxidizing gas exhaust manifold 120. This flow direction is shown by the open arrows in FIG. 8 and corresponds to the flow direction of the oxidizing gas according to the invention. The oxidizing gas flowing inside the cathode-side porous flow path layer 850 flows via the cathode-side surface opening of the oxidizing gas exhaust flow path 660 into the oxidizing gas exhaust flow path 660 and is discharged to the oxidizing gas exhaust manifold 120. Part of the oxidizing gas flowing through the cathode-side porous flow path layer 850 is diffused over the whole cathode diffusion layer 830 adjoining the cathode-side porous flow path layer 850 and is supplied to the cathode of the power generation layer 810 to be subjected to the cathode reaction (for example, $2H^+ + 2e^- + (1/2)O_2 \rightarrow H_2O$).

Referring to FIG. 9B, the fuel gas (hydrogen gas) is supplied to the fuel gas supply manifold 130. As shown by the arrows in FIG. 9B, the fuel gas supplied to the fuel gas supply manifold 130 flows through the fuel gas supply flow path 630 and enters the anode-side porous flow path layer 840 via the anode-side surface opening of the fuel gas supply flow path 630. The fuel gas entering the anode-side porous flow path layer 840 flows inside the anode-side porous flow path layer 840 forming the fuel gas flow path in the direction from the oxidizing gas exhaust manifold 120 to the oxidizing gas supply manifold 110. This flow direction is shown by the closed arrows in FIG. 8 and corresponds to the flow direction of the fuel gas according to the invention. The fuel gas flowing inside the anode-side porous flow path layer 840 flows via the anode-side surface opening of the fuel gas exhaust flow path 640 into the fuel gas exhaust flow path 640 and is discharged to the fuel gas exhaust manifold 140. Part of the fuel gas flowing through the anode-side porous flow path layer 840 is diffused over the whole anode diffusion layer 820 adjoining the anode-side porous flow path layer 840 and is supplied to the anode of the power generation layer 810 to be subjected to the anode reaction (for example, $H_2 \rightarrow 2H^+ + 2e^-$).

As described above, in the fuel cell 100 of the embodiment, the flow direction of the oxidizing gas (i.e., the direction shown by the open arrows in FIG. 8) along the planar direction (direction approximately orthogonal to the stacking direction) in the power generation area DA is opposed to the flow direction of the fuel gas (i.e., the direction shown by the closed arrows in FIG. 8) along the planar direction in the power generation area DA. This means that the fuel cell 100 of the embodiment is the counter-flow type fuel cell.

In the counter-flow type fuel cell, a downstream region along the flow direction of the oxidizing gas on the cathode side faces an upstream region along the flow direction of the fuel gas on the anode side in the stacking direction. Water (water vapor) generated by the electrochemical reaction on the cathode side is accordingly transferred from the downstream region along the flow direction of the oxidizing gas on the cathode side to the upstream region along the flow direction of the fuel gas on the anode side. The water vapor then moves on the flow of the fuel gas through the anode side, so as to protect the whole fuel cell from drying and thereby prevents degradation of the power generation performance. Accordingly the fuel cell can be operated in the non-humidifying operation without using a humidifier.

Figure 11:
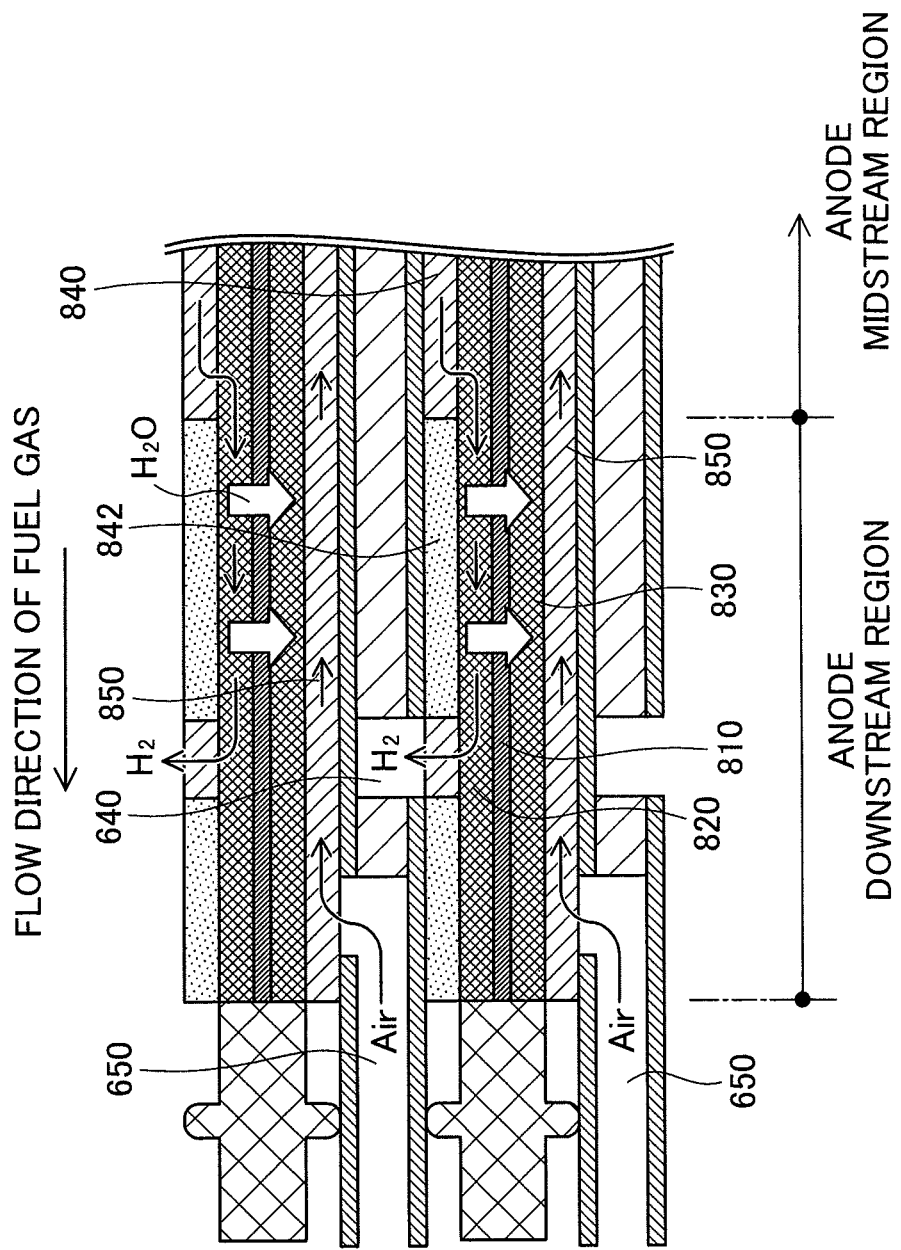
FIG. 11 is a sectional view of the fuel cell 100.

The anode-side structure of the fuel cell 100 and the flow of the fuel gas are described in detail with reference to FIGS. 10 and 11. FIGS. 10 and 11 are sectional views of the fuel cell 100. FIG. 10 is a close-up view showing the cross section of an X1 portion of FIG. 9A, and FIG. 11 is a close-up view showing the cross section of an X2 portion of FIG. 9A. As shown in FIGS. 10 and 11, the power generation area DA of the fuel cell 100 according to the embodiment has three regions aligned in the flow direction of the fuel gas shown in FIG. 8, i.e., an anode upstream region, an anode midstream region and an anode downstream region. The anode upstream region is the region including the most upstream position of the power generation area DA along the flow direction of the fuel gas. The anode downstream region is the region including the most downstream position of the power generation area DA along the flow direction of the fuel gas. The anode midstream region is the residual region of the power generation area DA. In this embodiment, the anode upstream region has the width of one fourth of the whole width of the power generation area DA along the flow direction of the fuel gas. The anode downstream region has the width of one eighth of the whole width, and the anode midstream region has the remaining width (i.e., the width of five eighths of the whole width). Accordingly, the anode midstream region is the area including the center position of the power generation area DA along the flow direction of the fuel gas. Since the fuel cell 100 of the embodiment is the counter-flow type fuel cell, the anode upstream region is located on the downstream side of the power generation area DA along the flow direction of the oxidizing gas and the anode downstream region is located on the upstream side of the power generation area DA along the flow direction of the oxidizing gas.

As shown in FIGS. 10 and 11, in the fuel cell 100 of the embodiment, a blocking portion 842, which blocks the gas flow path and has high gas flow resistance, is provided at specific positions in the anode-side porous flow path layer 840 corresponding to the anode upstream region and the anode downstream region. The blocking portions 842 may be provided by locating a dense material in place of the porous material at the specific positions in the anode-side porous flow path layer 840 corresponding to the anode upstream region and the anode downstream region. Alternatively the blocking portions 842 may be provided by processing the porous material to block the internal flow path (for example, compressing) at the specific positions in the anode-side porous flow path layer 840 corresponding to the anode upstream region and the anode downstream region.

The blocking portion 842 is formed in the anode-side porous flow path layer 840 in the anode upstream region, so that at least part of the fuel gas supplied to the anode side via the fuel gas supply flow path 630 does not flow through the blocking portion 842 having the high gas flow resistance but flows inside the anode diffusion layer 820 having the lower gas flow resistance along the flow direction of the fuel gas as shown by the arrows in FIG. 10. When the fuel gas reaches the anode midstream region, the fuel gas moves from the anode diffusion layer 820 into the anode-side porous flow path layer 840 having the lower gas flow resistance and flows along the flow direction of the fuel gas. The blocking portion 842 is formed in the anode-side porous flow path layer 840 in the anode downstream region, so that at least part of the fuel gas reaching the anode downstream region does not flow through the blocking portion 842 having the high gas flow resistance but flows inside the anode diffusion layer 820 having the lower gas flow resistance along the flow direction of the fuel gas as shown by the arrows in FIG. 11.

As described above, in the fuel cell 100 of the embodiment, while the fuel gas flows inside the anode-side porous flow path layer 840 along the flow direction of the fuel gas in the anode midstream region, at least part of the fuel gas flows inside the anode diffusion layer 820 along the flow direction of the fuel gas in the anode upstream region and in the anode downstream region. In the anode midstream region, the anode diffusion layer 820 is accordingly present between the fuel gas flow on the anode side and the oxidizing gas flow on the cathode side. In contrast, in the anode upstream region and in the anode downstream region, the anode diffusion layer 820 is not present between the fuel gas flow on the anode side and the oxidizing gas flow on the cathode side (since the fuel gas flows inside the anode diffusion layer 820). In the fuel cell 100 of the embodiment, the anode midstream region accordingly has the higher water vapor transfer resistance between the anode side and the cathode side (i.e., anode-cathode water vapor transfer resistance), compared with the anode upstream region and the anode downstream region.

Figure 12:
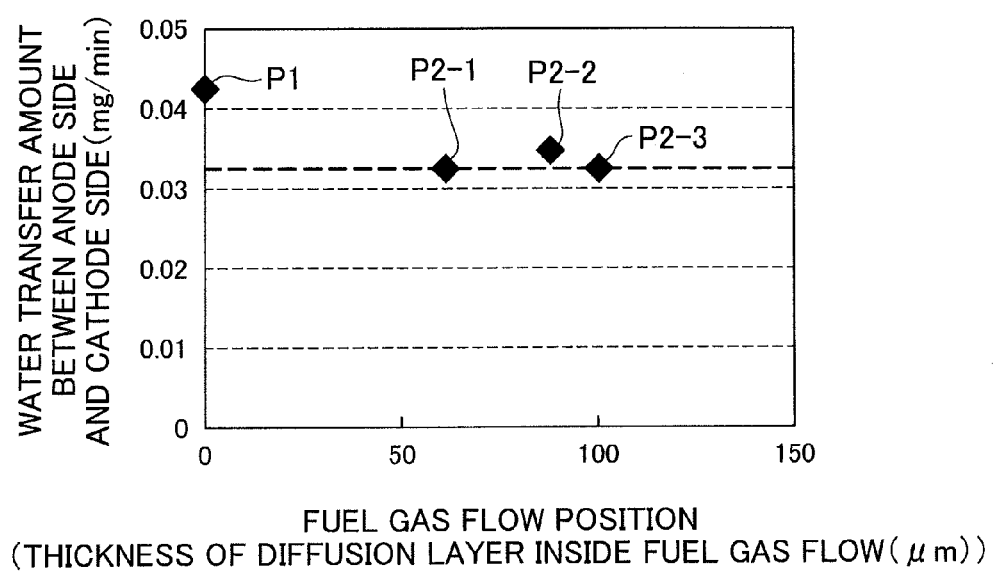
FIG. 12 illustrates an example of experimental results for the relationship between the fuel gas flow position and the water transfer amount from the other electrode.

FIG. 12 illustrates an example of experimental results for the relationship between the fuel gas flow position and the water transfer amount from the other electrode side. The thickness of the diffusion layer inside the fuel gas flow is plotted on the abscissa as the fuel gas flow position. A point P1 shows the state in which the fuel gas flows inside the anode diffusion layer 820. Points P2-1, P2-2 and P2-3 show the state in which the fuel gas flows inside the anode-side porous flow path layer 840. In any case, the oxidizing gas flows inside the cathode-side porous flow path layer 850. As clearly understood from FIG. 12, the state in which the fuel gas flows inside the anode diffusion layer 820 (point P1) has the greater water (water vapor) transfer amount from the other electrode side (i.e., the lower anode-cathode water vapor transfer resistance), compared with the state in which the fuel gas flows inside the anode-side porous flow path layer 840 (points P2-1, P2-2 and P2-3).

Figure 13A:
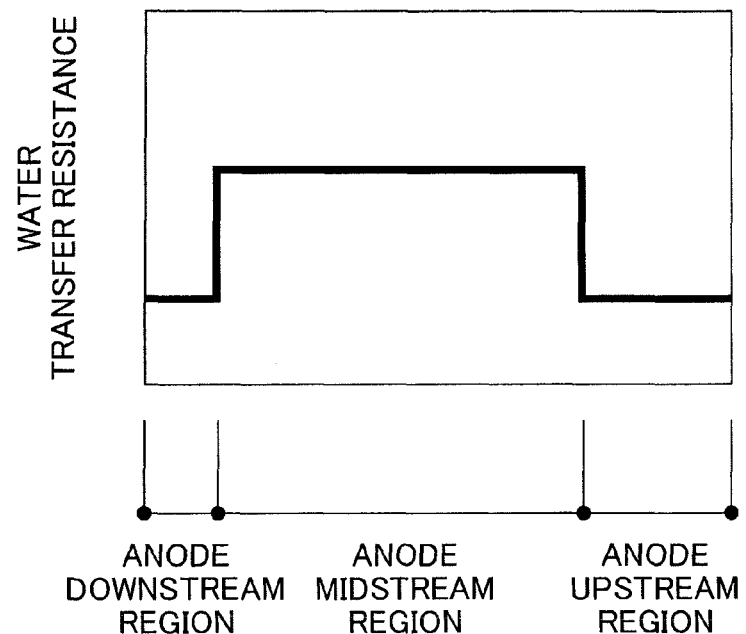
FIG. 13A and FIG. 13B illustrate an example of the anode-cathode water vapor transfer resistance in the respective regions of the fuel cell.
Figure 13B:
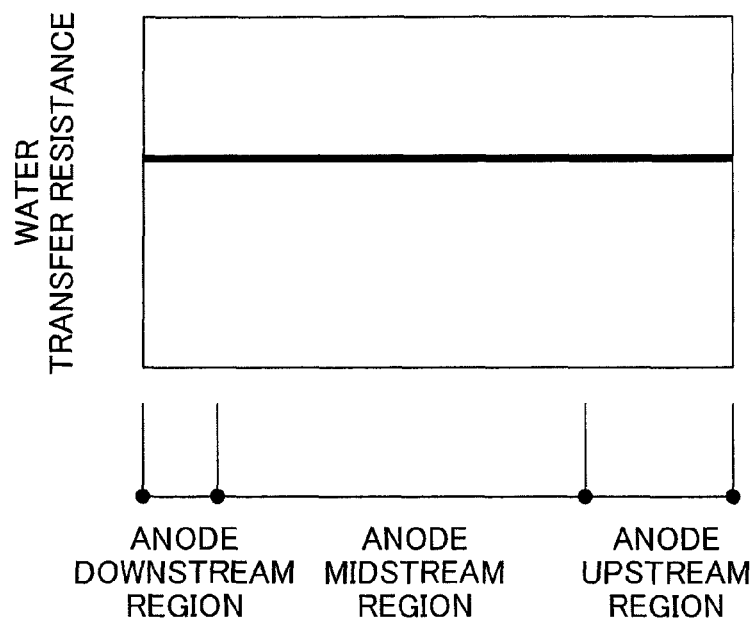

FIG. 13A and FIG. 13B illustrate an example of the anode-cathode water vapor transfer resistance in the respective regions of the fuel cell. FIG. 13A shows the anode-cathode water vapor transfer resistance in the respective regions of the fuel cell 100 according to the embodiment, and FIG. 13B shows the anode-cathode water vapor transfer resistance in the respective regions of a fuel cell according to a comparative example. As described above, in the fuel cell 100 of the embodiment, the anode midstream region has the higher water vapor transfer resistance than the anode upstream region and the anode downstream region. In the fuel cell of the comparative example without the blocking portions 842, the water vapor transfer resistance is kept constant over all the regions.

Figure 14A:
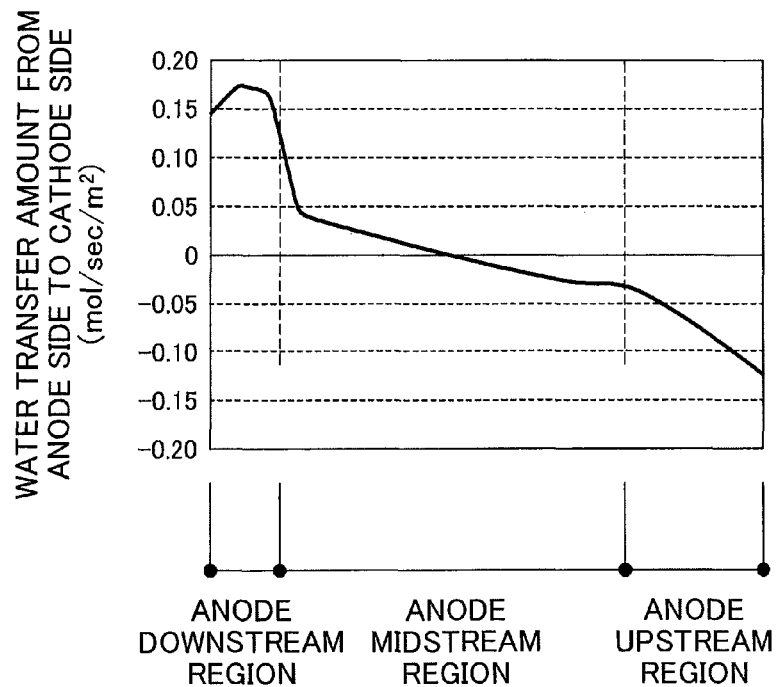
FIG. 14A and FIG. 14B illustrate an example of calculation results of the anode-cathode water transfer amount in the respective regions of the fuel cell.
Figure 14B:
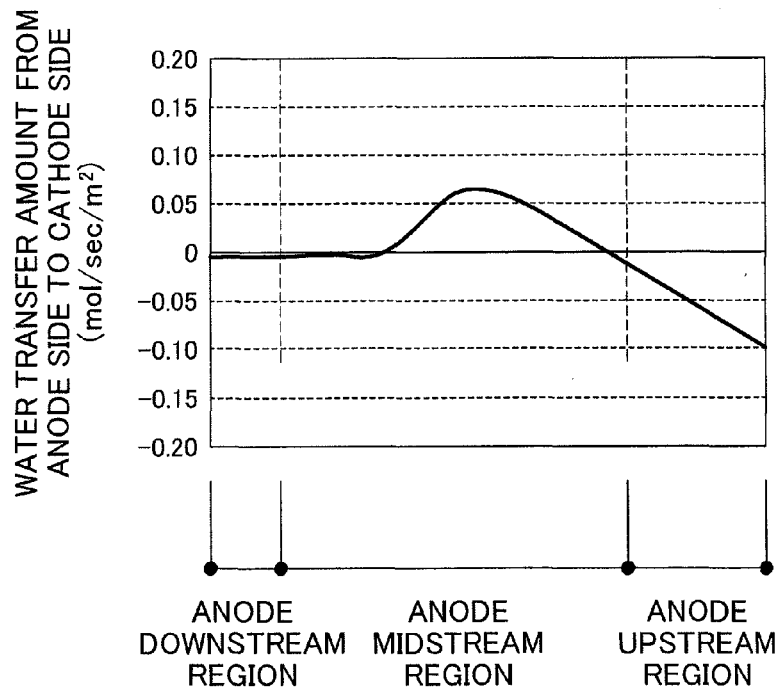
Figure 15A:
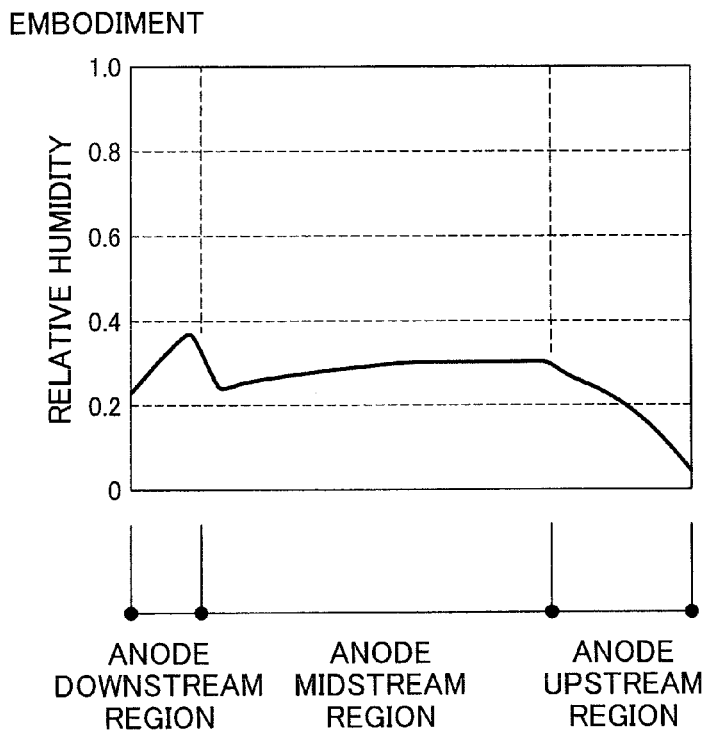
FIG. 15A and FIG. 15B show an example of calculation results of the relative humidity in the respective regions of the fuel cell.
Figure 15B:
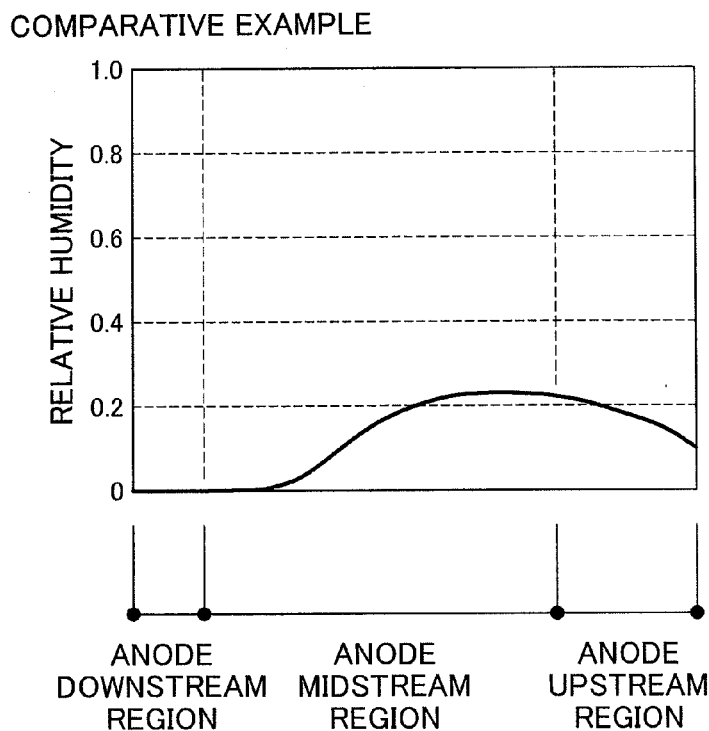
Figure 16A:
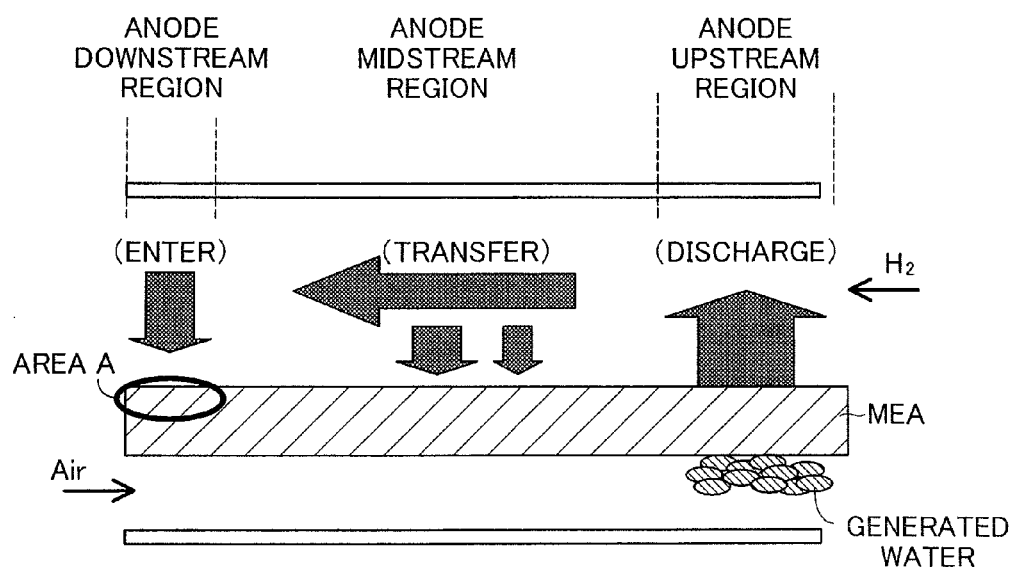
FIG. 16A and FIG. 16B conceptually illustrate the water transfer in the fuel cell.
Figure 16B:
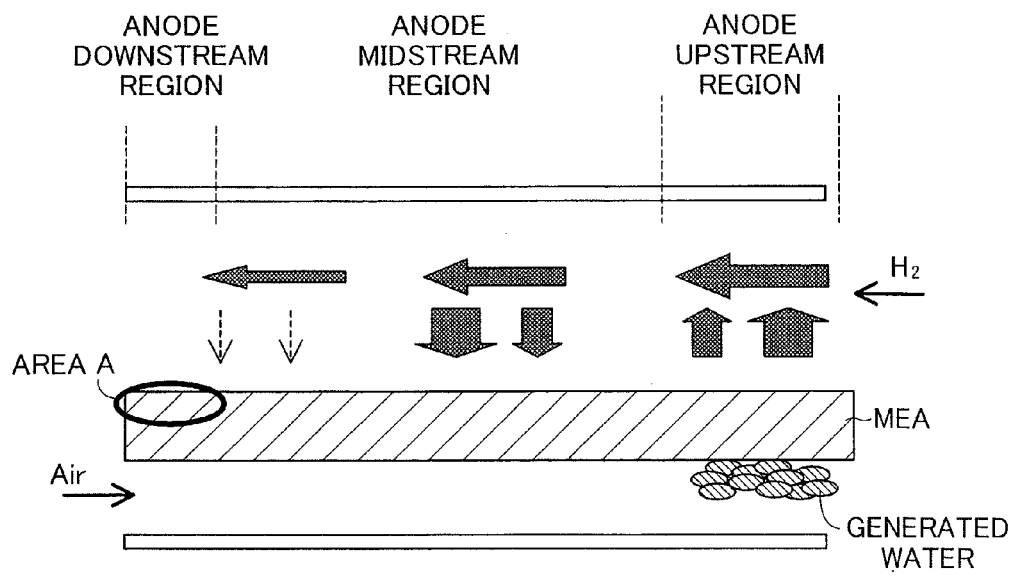

FIG. 14A and FIG. 14B illustrate an example of calculation results of the anode-cathode water transfer amount in the respective regions of the fuel cell. FIG. 15A and FIG. 15B show an example of calculation results of the relative humidity in the respective regions of the fuel cell. These calculation results are on the assumption that the fuel cell is operated in the state of high temperature (e.g., 105° C.) and low humidification. FIG. 16A and FIG. 16B conceptually illustrate the water transfer in the fuel cell. FIG. 14A shows the anode-cathode water (water vapor) transfer amount in the respective regions of the fuel cell 100 according to the embodiment, and FIG. 14B shows the anode-cathode water transfer amount in the respective regions of the fuel cell according to the comparative example. The ordinate of FIG. 14A and FIG. 14B show the water transfer amount from the anode side to the cathode side. The negative value shows transfer of water from the cathode side to the anode side. FIG. 15A shows the relative humidity in the respective regions of the fuel cell 100 according to the embodiment, and FIG. 15B shows the relative humidity in the respective regions of the fuel cell according to the comparative example. FIG. 16A shows the water transfer in the fuel cell 100 according to the embodiment, and FIG. 16B shows the water transfer in the fuel cell according to the comparative example.

The anode-cathode water vapor transfer resistance is kept constant over the respective areas in the fuel cell of the comparative example as shown in FIG. 13. As shown in FIGS.

14B and 16B, in the fuel cell of the comparative example, water (water vapor) generated on the cathode side is transferred from the cathode side to the anode side in the anode upstream region. The water vapor transferred to the anode side is transferred to the cathode side in the anode midstream region while moving on the flow of the fuel gas toward the anode downstream region. Little amount of water vapor thus reaches the anode downstream region on the anode side. The water vapor reaching the anode downstream region on the anode side is not transferred to the cathode side but is discharged outside. As shown in FIGS. 15B and 16B, the fuel cell of the comparative example does not sufficiently protect especially an MEA portion located in the anode downstream region (i.e., area A shown in FIG. 16B) from drying and does not effectively prevent degradation of the power generation performance.

In the fuel cell 100 of the embodiment, on the other hand, since the blocking portions 842 are formed in the anode-side porous flow path layer 840 in the anode upstream region and in the anode downstream region, the anode upstream region and the anode downstream region have the lower anode-cathode water vapor transfer resistance than the anode midstream region as shown in FIG. 13A. As shown in FIGS. 14S and 16A, in the fuel cell 100 of the embodiment, a greater amount of water vapor is transferred from the cathode side to the anode side in the anode upstream region. The water vapor transferred to the anode side is transferred to the cathode side in the anode midstream region while moving on the flow of the fuel gas toward the anode downstream region. A relatively large amount of water vapor, however, reaches the anode downstream region on the anode side. Most of the water vapor reaching the anode downstream region on the anode side is not discharged outside but is transferred to the cathode side (more specifically, an upstream region along the flow of the oxidizing gas). As shown in FIGS. 15A and 16A, the fuel cell 100 of the embodiment sufficiently protects the whole power generation area DA including an MEA portion located in the anode downstream region (i.e., area A shown in FIG. 16A) from drying and effectively prevents degradation of the power generation performance.

Figure 17:
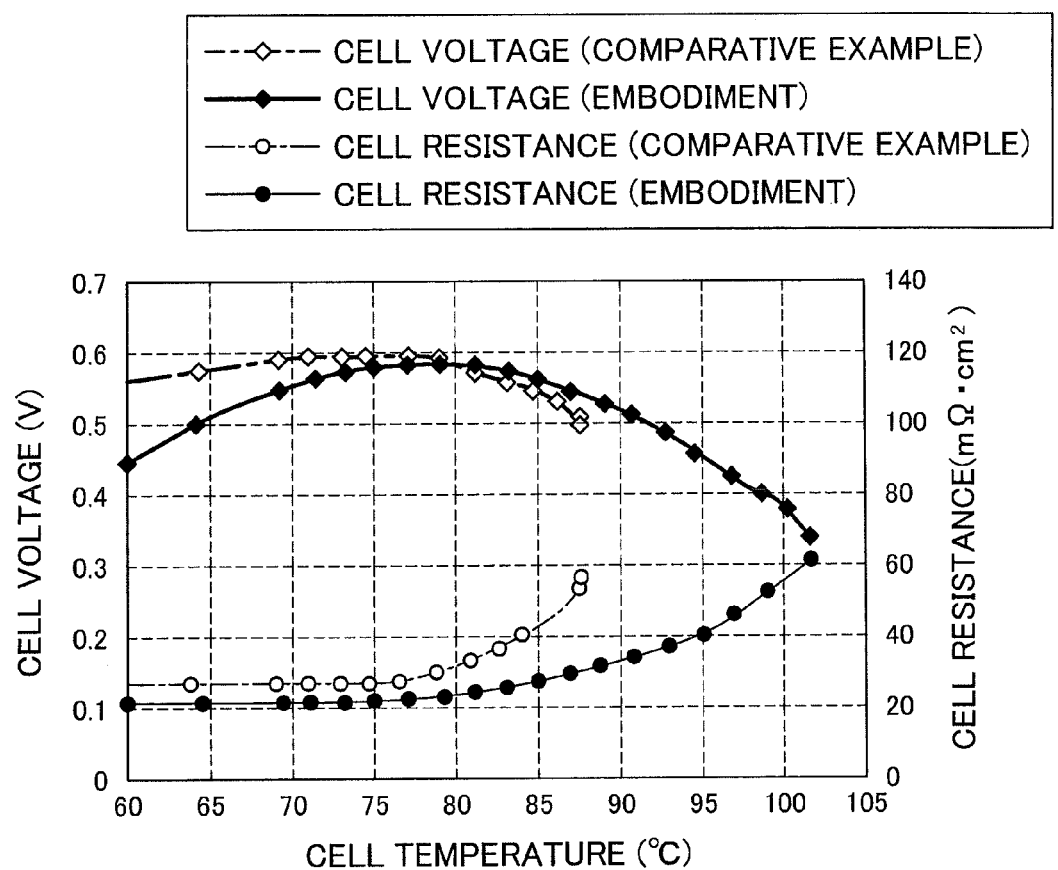
FIG. 17 illustrates an example of experimental results for the power generation performance of the fuel cell according to the first embodiment.

FIG. 17 illustrates an example of experimental results for the power generation performance of the fuel cell according to the first embodiment. As shown in FIG. 17, the fuel cell 100 of the embodiment more effectively suppresses the decrease in cell voltage during high temperature operation at the cell temperature of not lower than about 80° C. and the increase in cell resistance irrespective of the operating temperature, compared with the fuel cell of the comparative example.

As described above, in the fuel cell 100 of the embodiment, the blocking portions 842 are formed in the anode-side porous flow path layer 840 in the anode upstream region and in the anode downstream region, so that the fuel gas does not flow inside the anode-side porous flow path layer 840 but flows inside the anode diffusion layer 820 in the anode upstream region and in the anode downstream region. The anode midstream region accordingly has the higher water vapor transfer resistance between the anode side and the cathode side (i.e., anode-cathode water vapor transfer resistance) than the anode upstream region and the anode downstream region. In the fuel cell 100 of the embodiment, a relatively large amount of generated water (water vapor) is transferred from the cathode side to the anode side in the anode upstream region. While water vapor is transferred from the anode side to the cathode side to some extent in the anode midstream region, a relatively large amount of water vapor reaches the anode downstream region on the anode side and is transferred to the cathode side. The fuel cell 100 of the embodiment thus sufficiently protects the whole power generation area including the anode downstream region from drying and effectively prevents degradation of the power generation performance.

The fuel cell tends to be dried especially during high temperature operation (for example, at the cell temperature of not lower than 80° C.). The fuel cell 100 of the embodiment effectively protects the anode downstream region from drying even during high temperature operation and sufficiently prevents degradation of the power generation performance. A fuel cell system using the fuel cell 100 of the embodiment does not require a humidifier and has the improved cooling efficiency. This allows for size reduction and simplification of the cooling system device and thereby size reduction and simplification of the overall fuel cell system.

The fuel cell 100 of the embodiment has the cathode-side structure similar to the conventional structure. Formation of the blocking portions 842 in the anode-side porous flow path layer 840 slightly increases the pressure loss of the fuel gas on the anode side but has little effect on the power generation performance. Especially in the case of supply of the fuel gas from a high pressure tank, the fuel gas can be supplied at relatively high pressure, so that formation of the blocking portions 842 has no significant effect on the power generation performance.

B. Second Embodiment

Figure 18:
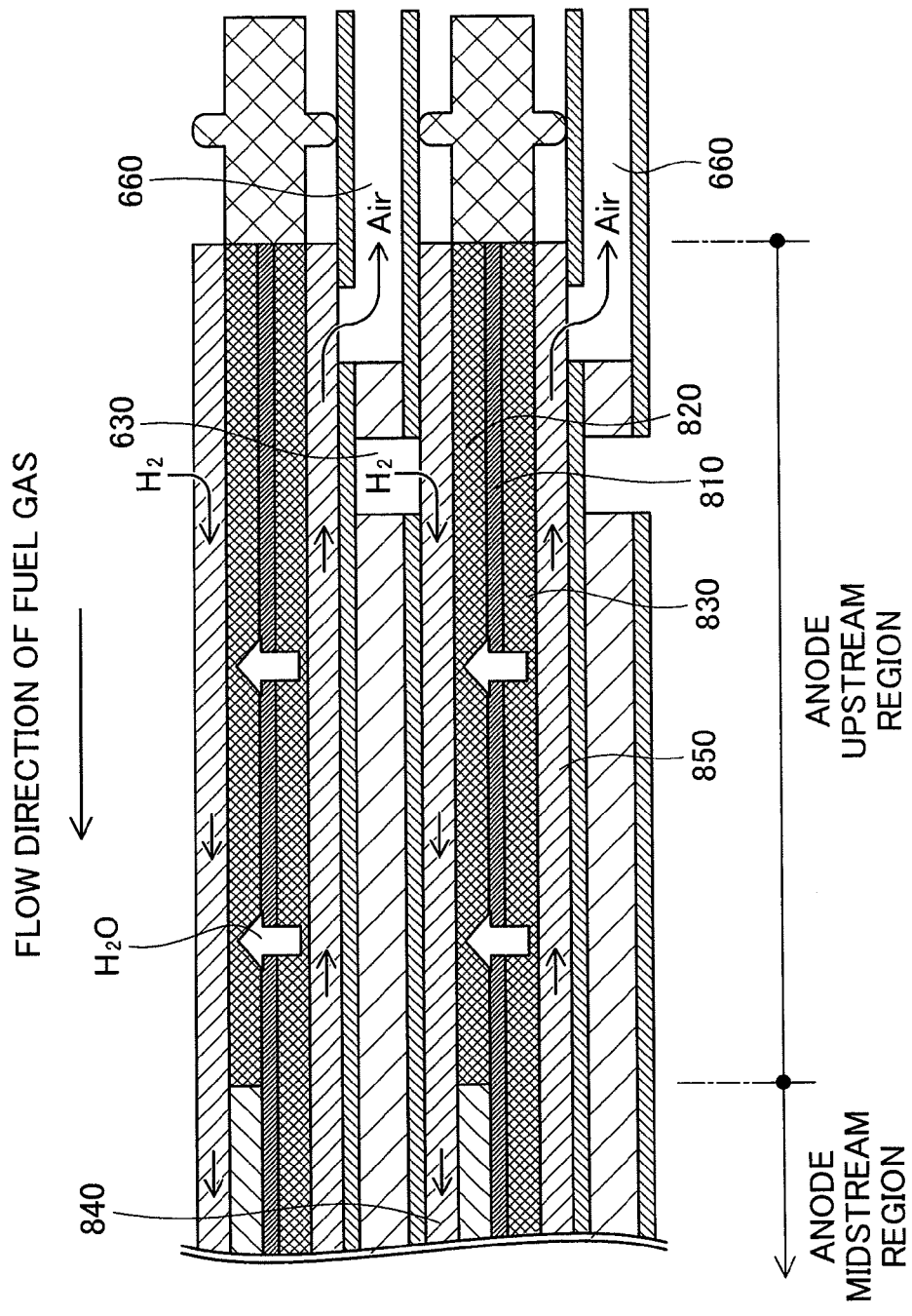
FIG. 18 illustrates the structure of a fuel cell according to a second embodiment.
Figure 19:
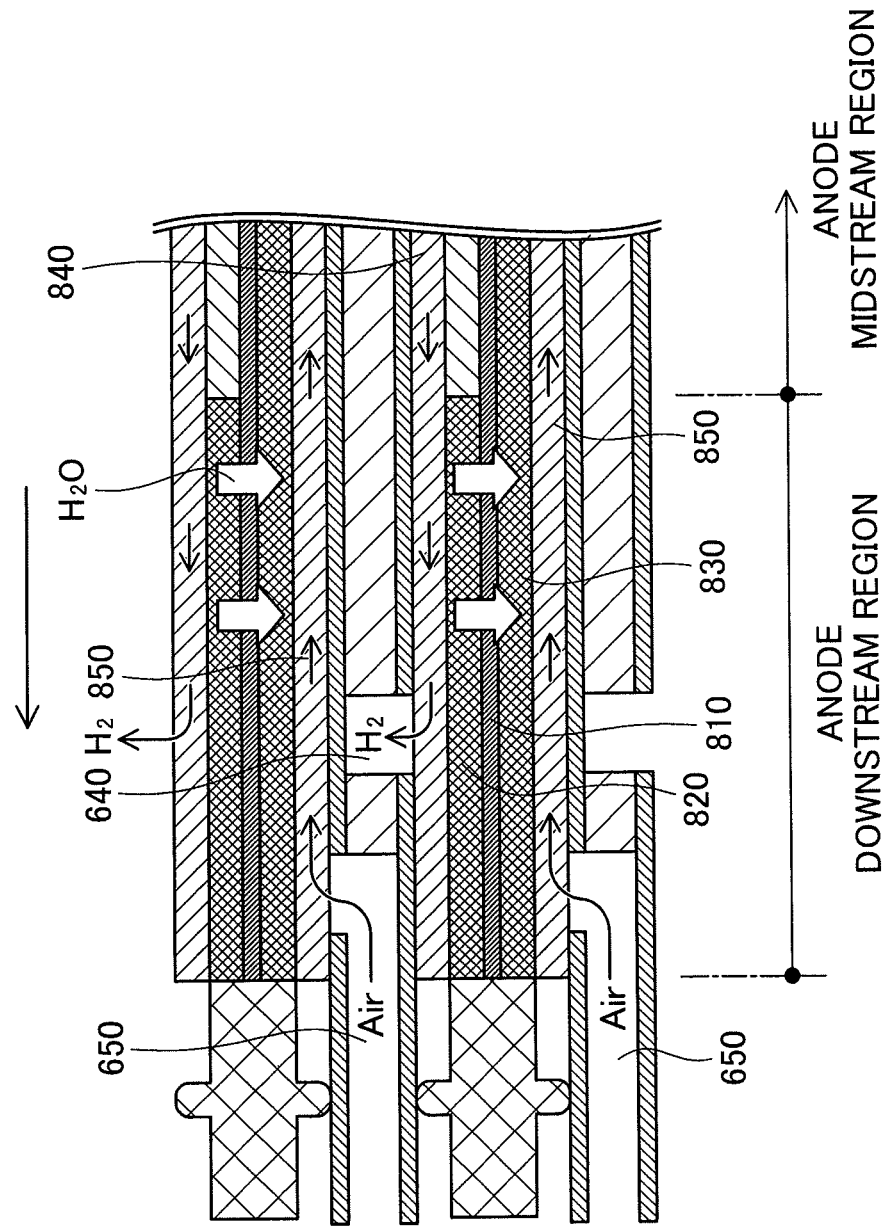
FIG. 19 illustrates the structure of the fuel cell according to the second embodiment.
Figure 20:
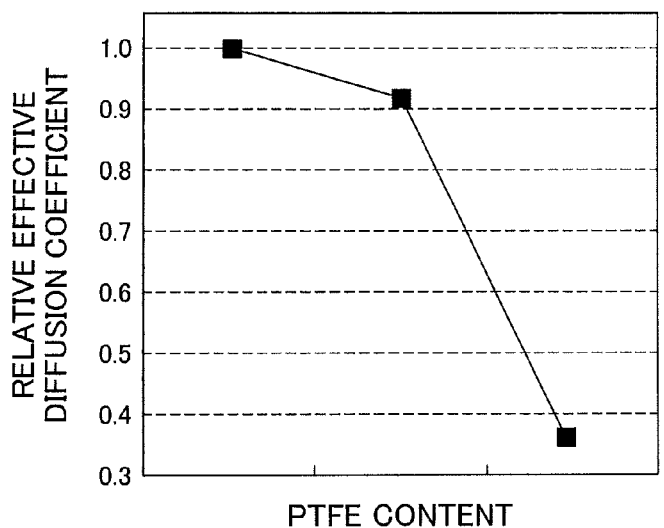
FIG. 20 illustrates the relationship between the PTFE content of the anode diffusion layer and the relative effective diffusion coefficient.

FIGS. 18 and 19 illustrate the structure of a fuel cell according to a second embodiment. FIG. 18 is a close-up sectional view corresponding to the X1 portion of FIG. 9A, and FIG. 19 is a close-up sectional view corresponding to the X2 portion of FIG. 9A. In the fuel cell of the second embodiment, the structure of the anode diffusion layer 820 differs among the respective regions. More specifically, the anode diffusion layer 820 in the anode midstream region has the greater PTFE content than the anode diffusion layer 820 in the anode upstream region and in the anode downstream region, so that the anode diffusion layer 820 in the anode midstream region has the higher density than the anode diffusion layer 820 in the anode upstream region and in the anode downstream region. In this embodiment, the anode diffusion layer 820 in the anode midstream region accordingly has the higher diffusion resistance than the anode diffusion layer 820 in the anode upstream region and in the anode downstream region. FIG. 20 illustrates the relationship between the PTFE content of the anode diffusion layer and the relative effective diffusion coefficient. As shown in FIG. 12, the greater PTFE content of the anode diffusion layer 820 (i.e., the higher density) results in the smaller diffusion coefficient (i.e., the higher diffusion resistance) of the anode diffusion layer 820. The density is equal to "1.0-porosity".

The water vapor transfer resistance between the anode side and the cathode side (i.e., anode-cathode water vapor transfer resistance) increases with an increase in diffusion resistance of the anode diffusion layer 820. In the fuel cell of the second embodiment, the anode midstream region has the higher water vapor transfer resistance than the anode upstream region and the anode downstream region. As in the first embodiment, in the fuel cell of the second embodiment, a relatively large amount of generated water (water vapor) is transferred from the cathode side to the anode side in the anode upstream region. While the transfer of water vapor from the anode side to the cathode side is suppressed in the anode midstream region, a relatively large amount of water vapor reaches the anode downstream region on the anode side and is transferred to the cathode side. The fuel cell of the second embodiment thus sufficiently protects the whole power generation area including the anode downstream region from drying and effectively prevents degradation of the power generation performance.

Figure 21:
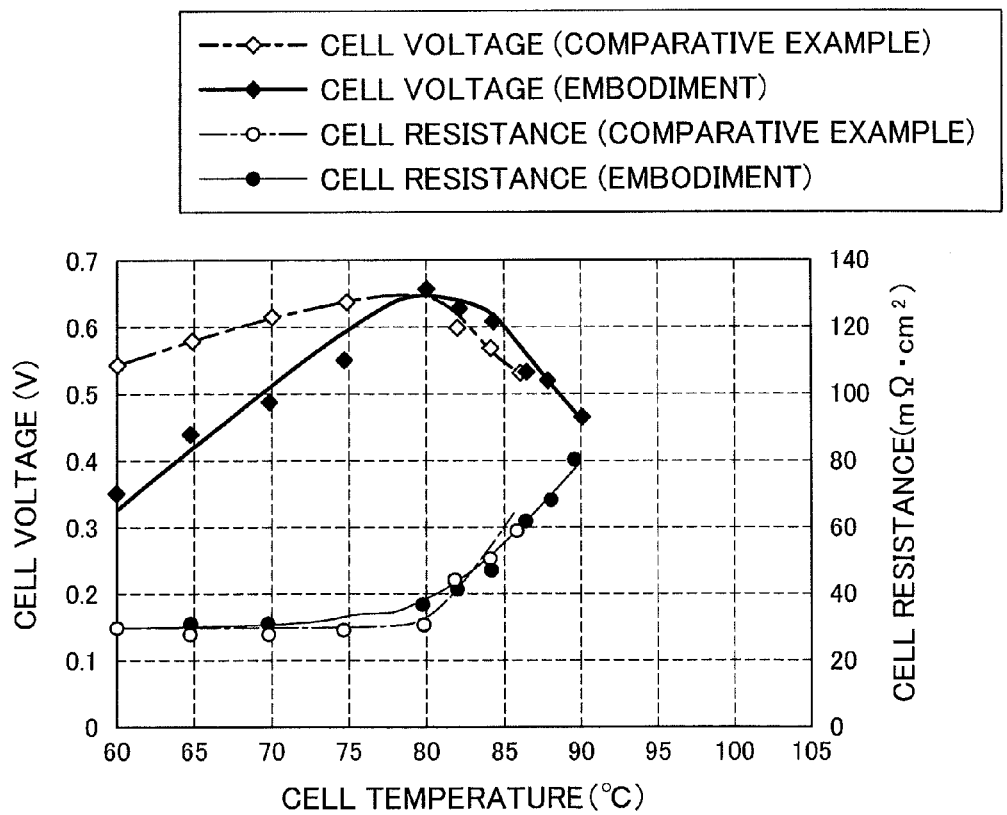
FIG. 21 illustrates an example of experimental results for the power generation performance of the fuel cell according to the second embodiment.

FIG. 21 illustrates an example of experimental results for the power generation performance of the fuel cell according to the second embodiment. As shown in FIG. 21, the fuel cell of the second embodiment more effectively suppresses the decrease in cell voltage during high temperature operation at the cell temperature of not lower than about 80° C. and the increase in cell resistance, compared with the fuel cell of the comparative example.

As in the first embodiment, the fuel cell of the second embodiment has the cathode-side structure similar to the conventional structure. Increasing the diffusion resistance of the anode diffusion layer 820 slightly increases the pressure loss of the fuel gas on the anode side but has little effect on the power generation performance. Especially in the case of supply of the fuel gas from a high pressure tank, the fuel gas can be supplied at relatively high pressure, so that varying the diffusion resistance of the anode diffusion layer 820 has no significant effect on the power generation performance.

C. Third Embodiment

Figure 22:
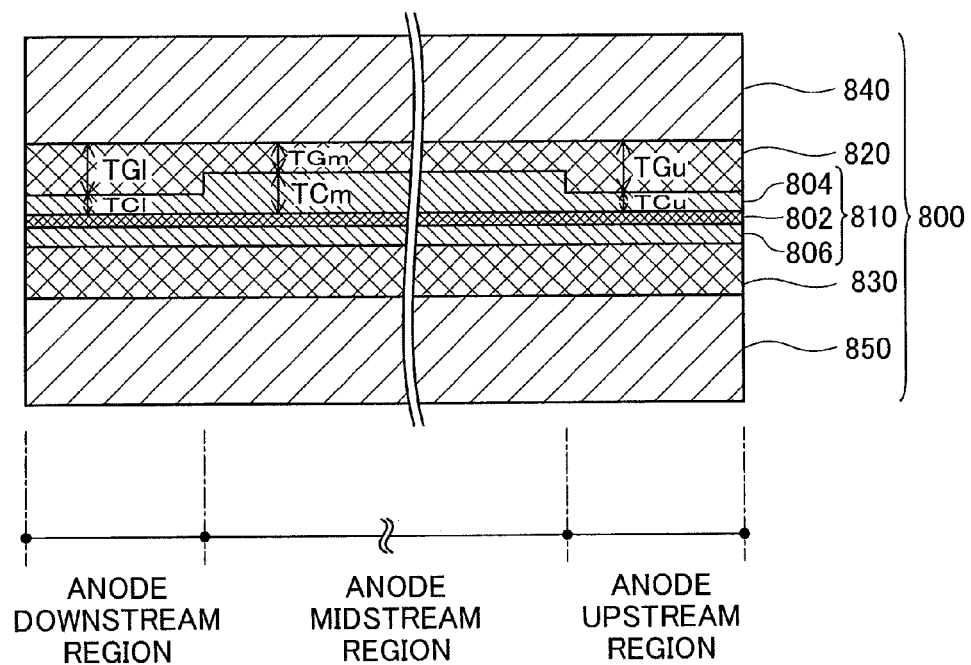
FIG. 22 illustrates the structure of a fuel cell according to a third embodiment.

FIG. 22 illustrates the structure of a fuel cell according to a third embodiment. FIG. 22 is a close-up view of the sectional structure of the stacked assembly 800 in the fuel cell 100 of the third embodiment. As shown in FIG. 22, the anode diffusion layer 820 of the third embodiment has a compressed portion in the anode midstream region, so that the anode diffusion layer 820 in the anode midstream region has the higher density (i.e., is more dense) than the anode diffusion layer 820 in the anode upstream region and in the anode downstream region. In the third embodiment, the anode diffusion layer 820 in the anode midstream region accordingly has the higher diffusion resistance than the anode diffusion layer 820 in the anode upstream region and in the anode downstream region. The compressing work makes thickness TGm of the anode diffusion layer 820 in the anode midstream region less than thickness TGu of the anode diffusion layer 820 in the anode upstream region and thickness TGl of the anode diffusion layer 820 in the anode downstream region.

In the third embodiment, among the respective layers constituting the power generation layer 810 (i.e., electrolyte membrane 802, anode catalyst layer 804 and cathode catalyst layer 806), thickness TC of the anode catalyst layer 804 differs among the respective regions. More specifically, thickness TCm of the anode catalyst layer 804 in the anode midstream region is made greater than thickness TCu of the anode catalyst layer 804 in the anode upstream region and thickness TCl of the anode catalyst layer 804 in the anode downstream region. As shown in FIG. 22, the total thickness of the anode diffusion layer 820 and the anode catalyst layer 804 is made substantially the same over the respective regions (anode midstream region, anode upstream region and anode downstream region) of the fuel cell.

Figure 23:
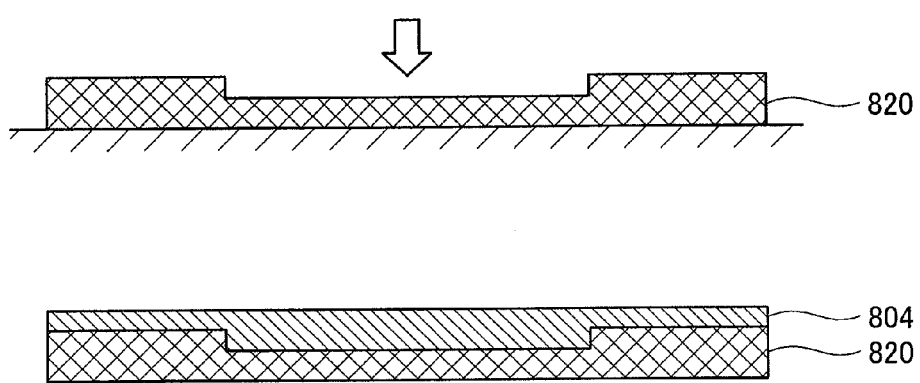
FIG. 23 illustrates part of the manufacturing process of the fuel cell according to the third embodiment.

FIG. 23 illustrates part of the manufacturing process of the fuel cell according to the third embodiment. As shown in FIG. 23, the manufacturing process of the third embodiment presses or compresses a specific part of the material for the anode diffusion layer 820 to be located in the anode midstream region. This pressing work concaves the surface of the specific part of the anode diffusion layer 820 to be located in the anode midstream region, relative to the surface of the remaining part. The anode catalyst layer 804 is formed on the concaved surface of the anode diffusion layer 820. The anode catalyst layer 804 may be formed, for example, by applying catalyst ink on the surface of the anode diffusion layer 820 with a squeegee. Forming the anode catalyst layer 804 in this manner makes the thickness TCm of the anode catalyst layer 804 in the anode midstream region greater than the thickness TCu of the anode catalyst layer 804 in the anode upstream region and the thickness TCl of the anode catalyst layer 804 in the anode downstream region, while making the total thickness of the anode diffusion layer 820 and the anode catalyst layer 804 substantially the same over the respective regions.

As described above, in the fuel cell of the third embodiment, the anode diffusion layer 820 in the anode midstream region has the higher diffusion resistance than the anode diffusion layer 820 in the anode upstream region and in the anode downstream region. Like the second embodiment, the anode midstream region accordingly has the higher water vapor transfer resistance than the anode upstream region and the anode downstream region. In the fuel cell of the third embodiment, the anode catalyst layer 804 in the anode midstream region has the greater thickness than the anode catalyst layer 804 in the anode upstream region and in the anode downstream region. This further increases the water vapor transfer resistance in the anode midstream region, compared with the water vapor transfer resistance in the anode upstream region and in the anode downstream region. In the fuel cell of the third embodiment, a relatively large amount of generated water (water vapor) is transferred from the cathode side to the anode side in the anode upstream region. While the transfer of water vapor from the anode side to the cathode side is suppressed in the anode midstream region, a relatively large amount of water vapor reaches the anode downstream region on the anode side and is transferred to the cathode side. The fuel cell of the third embodiment thus sufficiently protects the whole power generation area including the anode downstream region from drying and effectively prevents degradation of the power generation performance.

Figure 24:
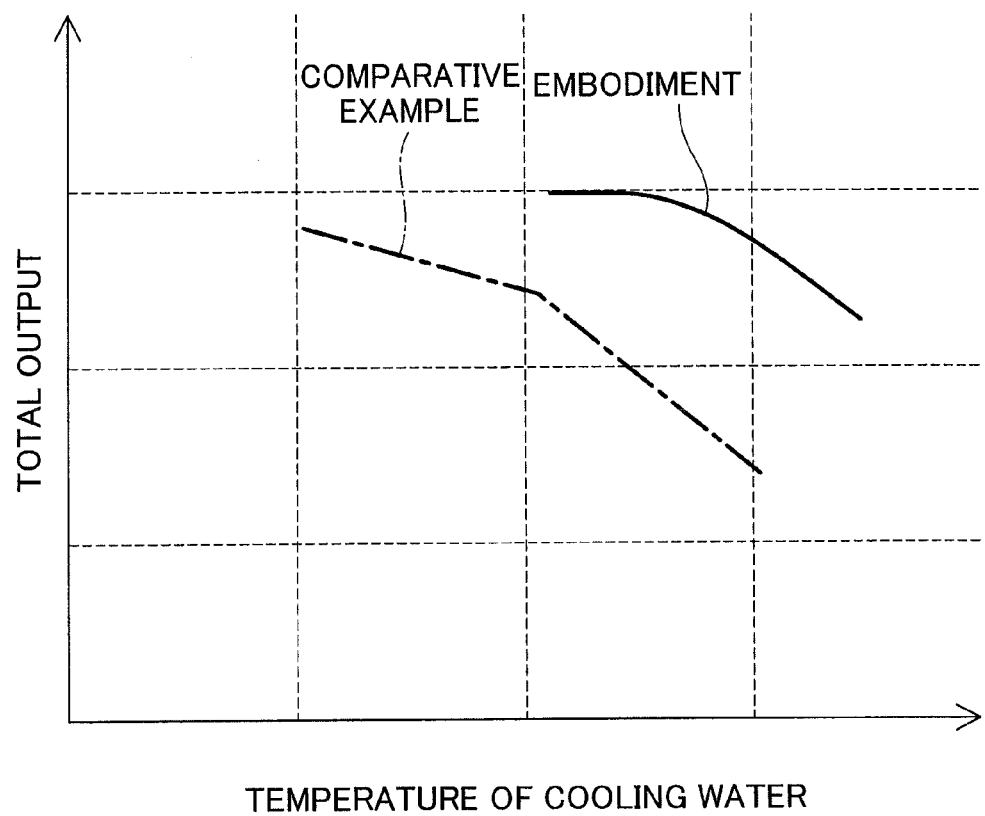
FIG. 24 illustrates an example of experimental results for the power generation performance of the fuel cell according to the third embodiment.

FIG. 24 illustrates an example of experimental results for the power generation performance of the fuel cell according to the third embodiment. FIG. 24 shows the experimental results for the relationship between the temperature of cooling water and the total output with respect to the fuel cell of the third embodiment and a fuel cell of a comparative example having the same thickness of the anode diffusion layer 820 over the respective regions and the same thickness of the anode catalyst layer 804 over the respective regions. As shown in FIG. 24, the fuel cell of the third embodiment significantly suppresses the decrease in output especially during high temperature operation, compared with the fuel cell of the comparative example.

In the fuel cell, the procedure of simply making the thickness of the anode catalyst layer 804 in the anode midstream region greater than the thickness of the anode catalyst layer 804 in the anode upstream region and in the anode downstream region may worsen the contact between the anode catalyst layer 804 and the anode diffusion layer 820 in the anode upstream region and in the anode downstream region, which may result in the poor electrical properties and the poor drainage performance of the fuel cell. This procedure also requires changing the application thickness of the anode catalyst layer 804 among the respective regions, thus complicating the manufacturing process. In the fuel cell of the third embodiment, however, the thickness of the anode catalyst layer 804 in the anode midstream region is made greater than the thickness of the anode catalyst layer 804 in the anode upstream region and in the anode downstream region, whilst the thickness of the anode diffusion layer 820 in the anode midstream region is made less than the thickness of the anode diffusion layer 820 in the anode upstream region and in the anode downstream region. This prevents the electrical properties and the drainage performance of the fuel cell from being worsened and prevents the manufacturing process from being complicated, while sufficiently protecting the whole power generation area including the anode downstream region from drying and effectively preventing degradation of the power generation performance.

D. Fourth Embodiment

Figure 25:
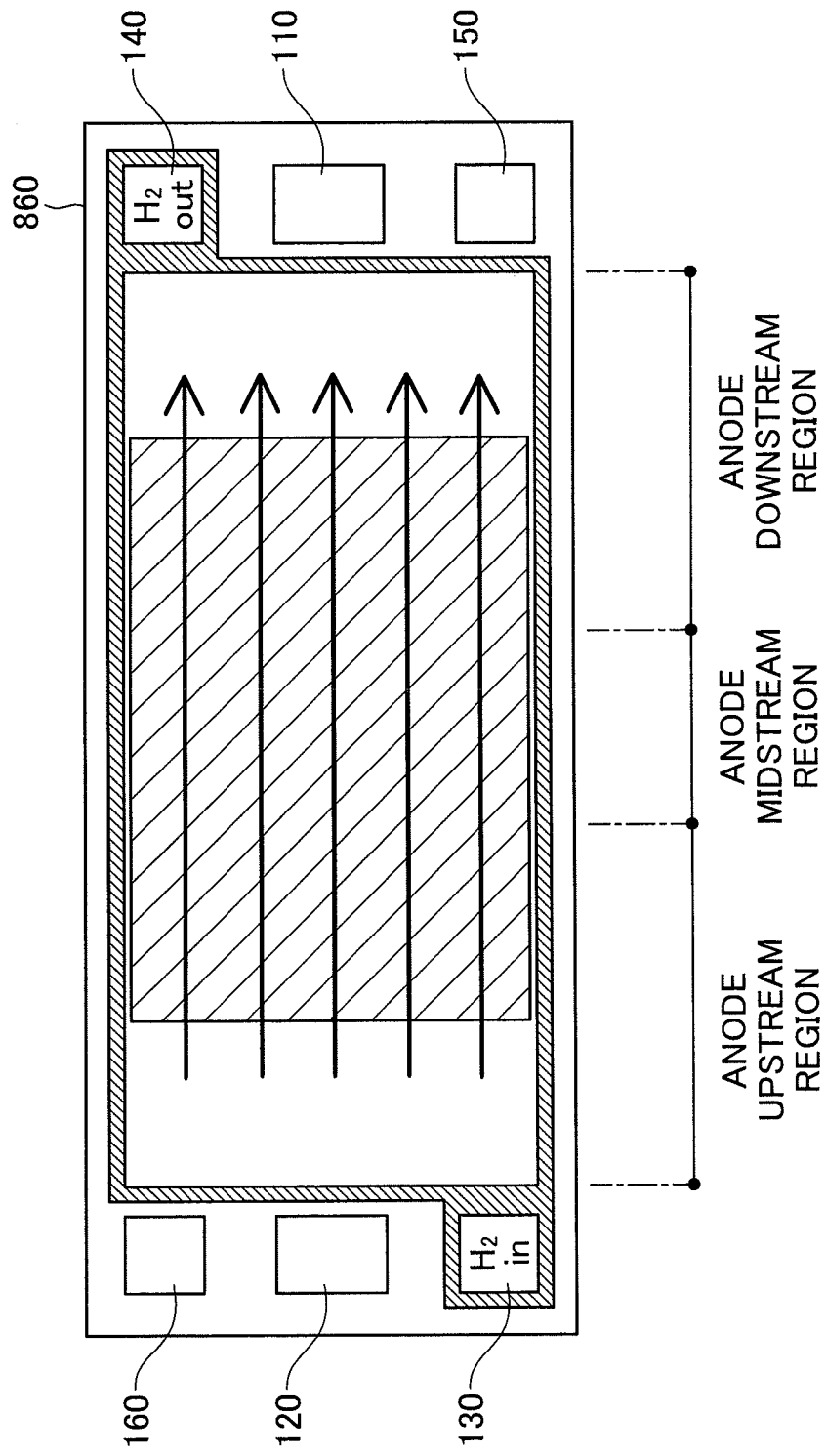
FIG. 25 illustrates the planar structure of an anode-side flow path layer 860 included in a fuel cell according to a fourth embodiment.

FIG. 25 illustrates the planar structure of an anode-side flow path layer 860 included in a fuel cell according to a fourth embodiment. The anode-side flow path layer 860 serves as the fuel gas flow path layer, like the anode-side porous flow path layer 840 of the first embodiment. In the fuel cell of the fourth embodiment, the fuel gas supplied to the fuel gas supply manifold 130 flows inside the anode-side flow path layer 860 toward the fuel gas exhaust manifold 140 and is discharged to the fuel gas exhaust manifold 140 as shown by the arrows in FIG. 25. The fuel gas flowing inside the anode-side flow path layer 860 is diffused over the whole anode diffusion layer 820 adjoining the anode-side flow path layer 860 and is supplied to the anode of the power generation layer 810 to be subjected to the anode reaction.

Like the anode-side porous flow path layer 840 of the first embodiment, the anode-side flow path layer 860 has blocking portions (not shown), which block the gas flow path and have high gas flow resistance, in the anode upstream region and in the anode downstream region. In the fuel cell of the fourth embodiment, the anode midstream region accordingly has the higher water vapor transfer resistance than the anode upstream region and the anode downstream region.

Figure 26:
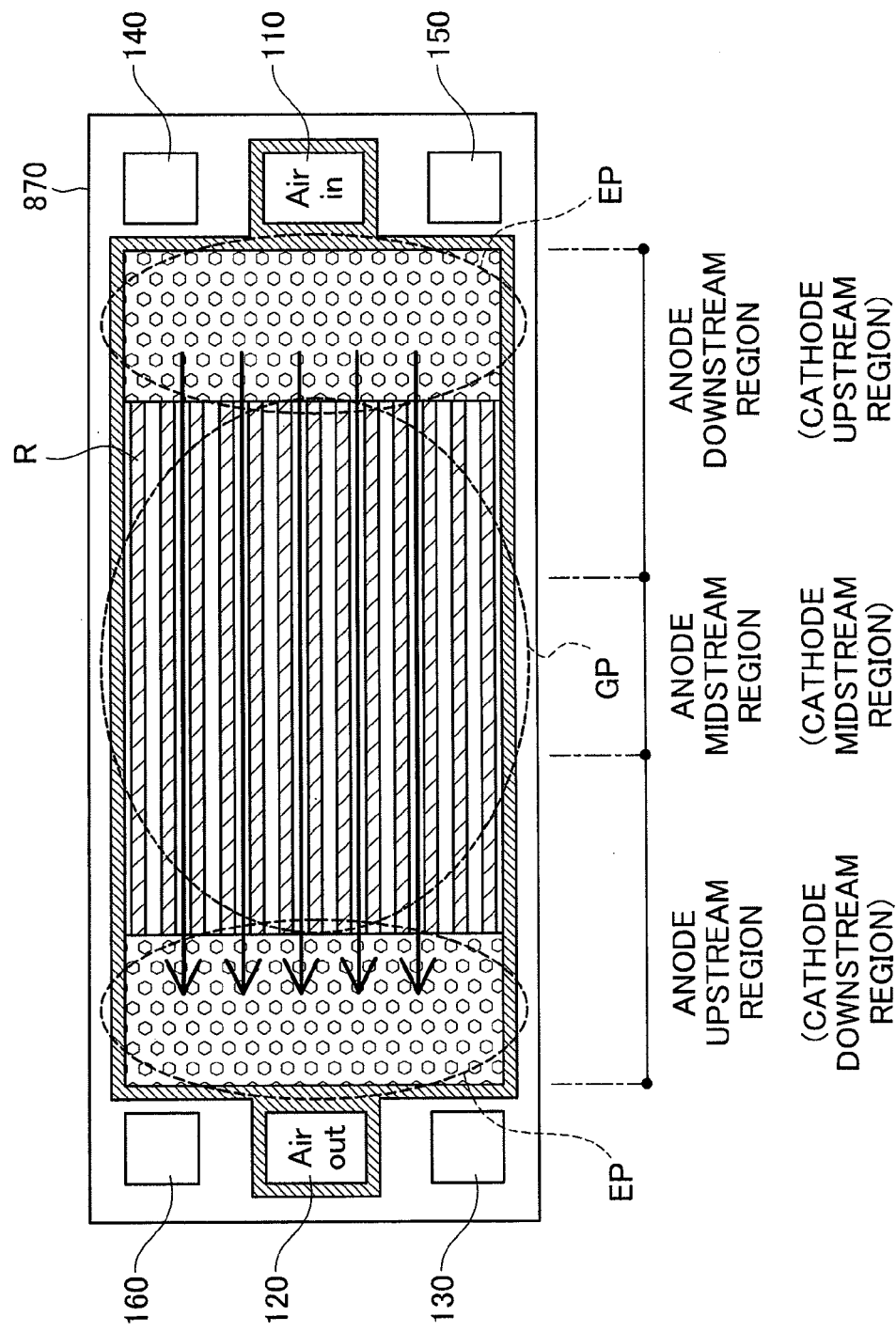
FIG. 26 illustrates the planar structure of a cathode-side flow path layer 870 included in the fuel cell according to the fourth embodiment.

FIG. 26 illustrates the planar structure of a cathode-side flow path layer 870 included in the fuel cell according to the fourth embodiment. The cathode-side flow path layer 870 serves as the oxidizing gas flow path layer, like the cathode-side porous flow path layer 850 of the first embodiment. In the fuel cell of the fourth embodiment, the oxidizing gas supplied to the oxidizing gas supply manifold 110 flows inside the cathode-side flow path layer 870 toward the oxidizing gas exhaust manifold 120 and is discharged to the oxidizing gas exhaust manifold 120 as shown by the arrows in FIG. 26. The oxidizing gas flowing inside the cathode-side flow path layer 870 is diffused over the whole cathode diffusion layer 830 adjoining the cathode-side flow path layer 870 and is supplied to the cathode of the power generation layer 810 to be subjected to the cathode reaction.

As shown in FIG. 26, the cathode-side flow path layer 870 includes an embossed portion EP having a plurality of protrusions and a grooved portion GP having a plurality of grooves formed by a plurality of ribs R extended substantially parallel to the flow direction of the oxidizing gas. In the cathode-side flow path layer 870, the embossed portion EP is provided in the anode upstream region (i.e., cathode downstream region) and in the anode downstream region (i.e., cathode upstream region), and the grooved portion GP is provided in the anode midstream region (i.e., cathode midstream region). The plurality of projections formed in the embossed portion EP define a net-like continuous space and serve to equally distribute the oxidizing gas in the planar direction. The grooved portion GP serves to efficiently flow the oxidizing gas in the direction from the oxidizing gas supply manifold 110 to the oxidizing gas exhaust manifold 120.

The anode-side flow path layer 860 and the cathode-side flow path layer 870 may be produced, for example, by pressing a stainless steel or titanium flat plate. Alternatively the anode-side flow path layer 860 and the cathode-side flow path layer 870 may be made of another conductive material, such as carbon.

As shown in FIGS. 25 and 26, the fuel cell of the fourth embodiment has slightly different outer shape and positions of the respective manifolds (oxidizing gas supply manifold 110, oxidizing gas exhaust manifold 120, fuel gas supply manifold 130, fuel gas exhaust manifold 140, cooling medium supply manifold 150 and cooling medium discharge manifold 160) from those of the first embodiment. Other than the features described in this embodiment, the fuel cell of the fourth embodiment has the similar structure and the similar functions and advantageous effects to those of the fuel cell of the first embodiment.

The cathode-side flow path layer 870 of the fourth embodiment has the embossed portion EP provided in the anode upstream region (i.e., in the cathode downstream region). Since the flow rate of the oxidizing gas is lowered in the embossed portion EP, liquid water tends to be accumulated in the embossed portion EP. The fuel cell of the fourth embodiment accordingly prevents deficiency of water on the cathode side in the anode upstream region (cathode downstream region) and ensures efficient water transfer from the cathode side to the anode side. In the fuel cell of the fourth embodiment, water is thus transferred from the cathode side to the anode side with high efficiency in the anode upstream region. While the transfer of water from the anode side to the cathode side is suppressed in the anode midstream region, a relatively large amount of water reaches the anode downstream region on the anode side and is transferred to the cathode side. The fuel cell of the fourth embodiment thus sufficiently protects the whole power generation area including the anode downstream region from drying and effectively prevents degradation of the power generation performance.

E. Fifth Embodiment

Figure 27:
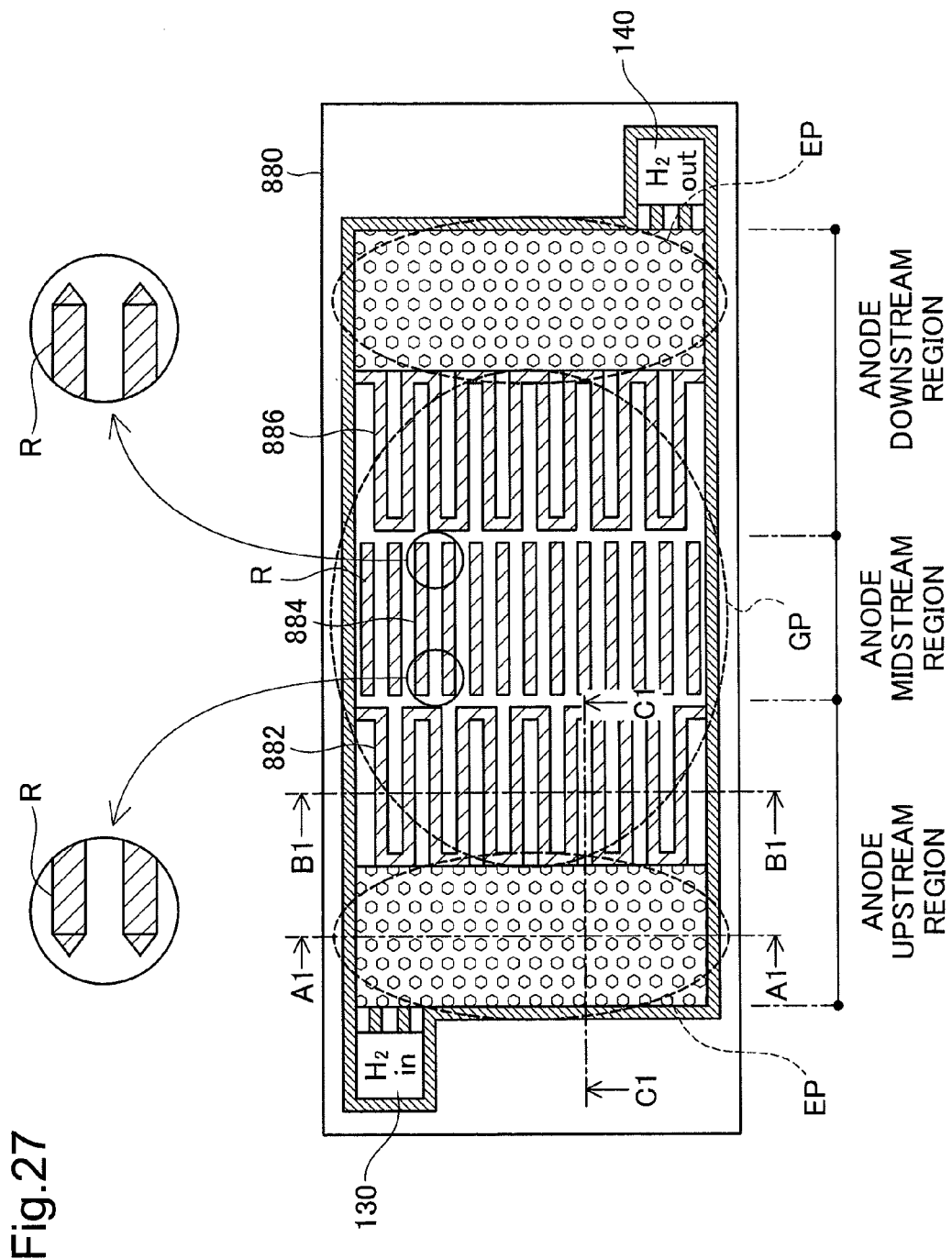
FIG. 27 illustrates the planar structure of an anode-side flow path layer 880 included in a fuel cell according to a fifth embodiment.

FIG. 27 illustrates the planar structure of an anode-side flow path layer 880 included in a fuel cell according to a fifth embodiment. The anode-side flow path layer 880 serves as the fuel gas flow path layer, like the anode-side porous flow path layer 840 of the first embodiment. In the fuel cell of the fifth embodiment, the fuel gas supplied to the fuel gas supply manifold 130 flows inside the anode-side flow path layer 880 toward the fuel gas exhaust manifold 140 and is discharged to the fuel gas exhaust manifold 140. The fuel gas flowing inside the anode-side flow path layer 880 is diffused over the whole anode diffusion layer 820 adjoining the anode-side flow path layer 880 and is supplied to the anode of the power generation layer 810 to be subjected to the anode reaction.

As shown in FIG. 27, the anode-side flow path layer 880 includes an embossed portion EP having a plurality of protrusions and a grooved portion GP having a plurality of grooves formed by a plurality of ribs R extended substantially parallel to the flow direction of the fuel gas. In the anode-side flow path layer 880, the embossed portion EP is provided in the anode upstream region and in the anode downstream region, and the grooved portion GP is provided in the anode midstream region. The plurality of projections formed in the embossed portion EP define a net-like continuous space and thereby serve to equally distribute the fuel gas in the planar direction. The grooved portion GP serves to efficiently flow the fuel gas in the direction from the fuel gas supply manifold 130 to the fuel gas exhaust manifold 140.

Figure 28:
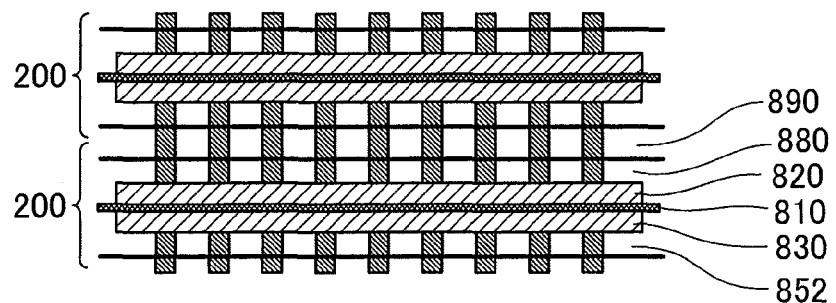
FIG. 28 illustrates the sectional structure of the fuel cell according to the fifth embodiment.
Figure 29:
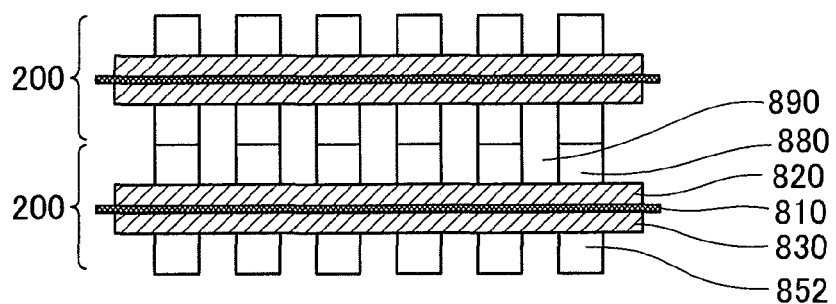
FIG. 29 illustrates the sectional structure of the fuel cell according to the fifth embodiment.
Figure 30:
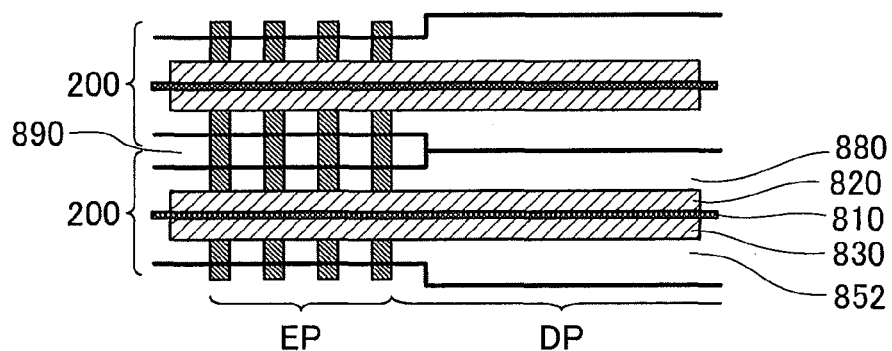
FIG. 30 illustrates the sectional structure of the fuel cell according to the fifth embodiment.

FIGS. 28 to 30 illustrate the sectional structures of the fuel cell according to the fifth embodiment. FIG. 28 shows the cross section of the fuel cell taken at the position A1-A1 of FIG. 27. FIG. 29 shows the cross section of the fuel cell taken at the position B1-B1 of FIG. 27. FIG. 30 shows the cross section of the fuel cell taken at the position C1-C1 of FIG. 27. As shown in FIGS. 28 to 30, in the fuel cell of the fifth embodiment, a cathode-side flow path layer 852 also includes an embossed portion EP and a grooved portion GP, like the anode-side flow path layer 880. A cooling medium flow path 890 is formed between the anode-side flow path layer 880 of a certain cell and the cathode-side flow path layer 852 of an adjacent cell.

The anode-side flow path layer 880 and the cathode-side flow path layer 852 may be produced, for example, by pressing a stainless steel or titanium flat plate. Alternatively the anode-side flow path layer 880 and the cathode-side flow path layer 852 may be made of another conductive material, such as carbon. The cathode-side flow path layer 852 may be designed without the embossed portion EP and the grooved portion GP.

Referring to FIG. 27, a specific part 882 of the grooved portion GP of the anode-side flow path layer 880 close to the embossed portion EP in the anode upstream region (hereinafter called "anode upstream grooved portion 882") and a specific part 886 of the grooved portion GP close to the embossed portion EP in the anode downstream region (hereinafter called "anode downstream grooved portion 886") are structured, such that the grooved flow paths formed by the ribs R are blocked in the middle of the flow direction of the fuel gas. In other words, the flow paths formed in the anode upstream grooved portion 882 and in the anode downstream grooved portion 886 are blocked flow paths including blockages of the fuel gas flow along the flow direction of the fuel gas. The remaining part 884 of the grooved portion GP of the anode-side flow path layer 880 (i.e., the part corresponding to the anode midstream region; hereinafter called "anode midstream grooved portion 884") is structured, on the other hand, such that the grooved flow paths formed by the ribs R are not blocked along the flow direction of the fuel gas. In other words, the flow paths formed in the anode midstream grooved portion 884 are linear flow paths without blockage of the fuel gas flow along the flow direction of the fuel gas.

As shown in FIG. 27, the anode midstream grooved portion 884 is designed, such that the respective grooved flow paths in the anode midstream grooved portion 884 are located along the extensions of the ribs R in the anode upstream grooved portion 882. The respective one ends of the ribs R in the anode midstream grooved portion 884 close to the anode upstream grooved portion 882 (i.e., upstream ends) are tapered to have the decreasing diameter (width) from that of the centers of the ribs R.

Similarly, the anode downstream grooved portion 886 is designed, such that the respective grooved flow paths in the anode downstream grooved portion 886 are located along the extensions of the ribs R in the anode midstream grooved portion 884. The respective other ends of the ribs R in the anode midstream grooved portion 884 close to the anode downstream grooved portion 886 (i.e., downstream ends) are tapered to have the decreasing diameter (width) from that of the centers of the ribs R.

As shown in FIG. 27, the fuel cell of the fifth embodiment has slightly different outer shape and positions of the respective manifolds from those of the first embodiment. Other than the features described in this embodiment, the fuel cell of the fifth embodiment has the similar structure and the similar functions and advantageous effects to those of the fuel cell of the first embodiment.

In the anode-side flow path layer 880 of the fifth embodiment, the grooved flow paths formed by the ribs R are blocked in the middle of the flow direction of the fuel gas in the anode upstream grooved portion 882 and in the anode downstream grooved portion 886 of the grooved portion GP. This structure facilitates the flow of the fuel gas from the anode-side flow path layer 880 to the anode diffusion layer 820 in the anode upstream region and in the anode downstream region. On the other hand, the grooved flow paths formed by the ribs R are not blocked in the middle of the flow direction of the fuel gas in the anode midstream grooved portion 884 of the grooved portion GP. This structure does not facilitate the flow of the fuel gas from the anode-side flow path layer 880 to the anode diffusion layer 820 in the anode midstream region. As in the first embodiment, in the fuel cell of the fifth embodiment, the anode midstream region has the higher water vapor transfer resistance from the anode side to the cathode side than the anode upstream region and the anode downstream region. In the fuel cell of the fifth embodiment, a relatively large amount of generated water (water vapor) is transferred from the cathode side to the anode side in the anode upstream region. While the transfer of water vapor from the anode side to the cathode side is suppressed in the anode midstream region, a relatively large amount of water vapor reaches the anode downstream region on the anode side and is transferred to the cathode side. The fuel cell of the fifth embodiment thus sufficiently protects the whole power generation area including the anode downstream region from drying and effectively prevents degradation of the power generation performance.

In the fuel cell of the fifth embodiment, the grooved portion GP is divided into the three portions, i.e., the anode upstream grooved portion 882, the anode midstream grooved portion 884 and the anode downstream grooved portion 886. This structure increases the flow rate of the fuel gas flow from the anode-side flow path layer 880 to the anode diffusion layer 820 in the anode upstream region and in the anode downstream region, thereby promoting the effect of sufficiently protecting the whole power generation area from drying and effectively preventing degradation of the power generation performance. Increasing the flow rate of the fuel gas flow from the anode-side flow path layer 880 to the anode diffusion layer 820 in the anode upstream region and in the anode downstream region prevents accumulation of water in the blockages (closures) of the anode upstream grooved portion 882 and the anode downstream grooved portion 886.

In the fuel cell of the fifth embodiment, the respective grooved flow paths in the anode midstream grooved portion 884 are located along the extensions of the ribs R in the anode upstream grooved portion 882, and the upstream ends of the respective ribs R in the anode midstream grooved portion 884 close to the anode upstream grooved portion 882 are tapered to have the decreasing diameter. This structure promotes the uniform distribution of the fuel gas flowing through the respective grooved flow paths in the anode midstream grooved portion 884, thus ensuring even power generation in the planar direction.

In the fuel cell of the fifth embodiment, the respective grooved flow paths in the anode downstream grooved portion 886 are located along the extensions of the ribs R in the anode midstream grooved portion 884, and the downstream ends of the respective ribs R in the anode midstream grooved portion 884 close to the anode downstream grooved portion 886 are tapered to have the decreasing diameter. This structure facilitates the supply of the fuel gas from all the grooved flow paths in the anode midstream grooved portion 884 to the inflow ends of the respective grooved flow paths in the anode downstream grooved portion 886, thus ensuring even power generation in the planar direction.

F. Modified Examples

The invention is not limited to the above embodiments but various modifications including modified examples described below may be made to the embodiments without departing from the scope of the invention. Some of possible examples are given below.

F1. Modified Example 1

Figure 31:
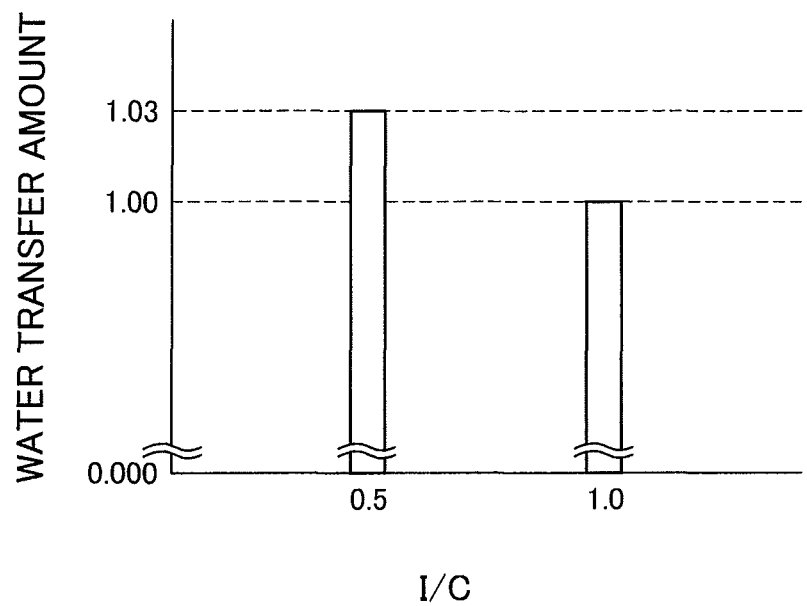
FIG. 31 illustrates the relationship between the I/C value of the catalyst layer and the anode-cathode water transfer amount.

In the embodiments described above, the anode midstream region is made to have the higher water vapor transfer resistance than the anode upstream region and the anode downstream region by forming the blocking portions 842 in the anode-side porous flow path layer 840 in the anode upstream region and in the anode downstream region or by increasing the diffusion resistance of the anode diffusion layer 820 in the anode midstream region. Another method may be adopted to make the water vapor transfer resistance in the anode midstream region higher than the water vapor transfer resistance in the anode upstream region and in the anode downstream region. As in the respective embodiments discussed above, such modification has the effect of sufficiently protecting the whole power generation area from drying and effectively preventing degradation of the power generation performance. In one modified structure, the amount of catalyst-support carbon and the amount of ionomer in the respective regions may be set, such that the anode midstream region has the higher ratio of the amount of ionomer to the amount of catalyst-support carbon in the anode (anode catalyst layer) (hereinafter called "I/C value") than the I/C value in the anode upstream region and in the anode downstream region. FIG. 31 illustrates the relationship between the I/C value of the catalyst layer and the anode-cathode water transfer amount. As shown in FIG. 31, the anode-cathode water (water vapor) transfer amount decreases (i.e., the anode-cathode water vapor transfer resistance increases) with an increase in I/C value. This is because the increase in I/C value decreases the porosity in the catalyst layer (i.e., decreases the surface area in the catalyst layer) and decreases the amount of moisture evaporation. Increasing the I/C value in the anode midstream region to be higher than the I/C value in the anode upstream region and in the anode downstream region causes the anode midstream region to have the higher water vapor transfer resistance than the anode upstream region and the anode downstream region. This modified structure also ensures the effect of sufficiently protecting the whole power generation area from drying and effectively preventing degradation of the power generation performance.

Figure 32:
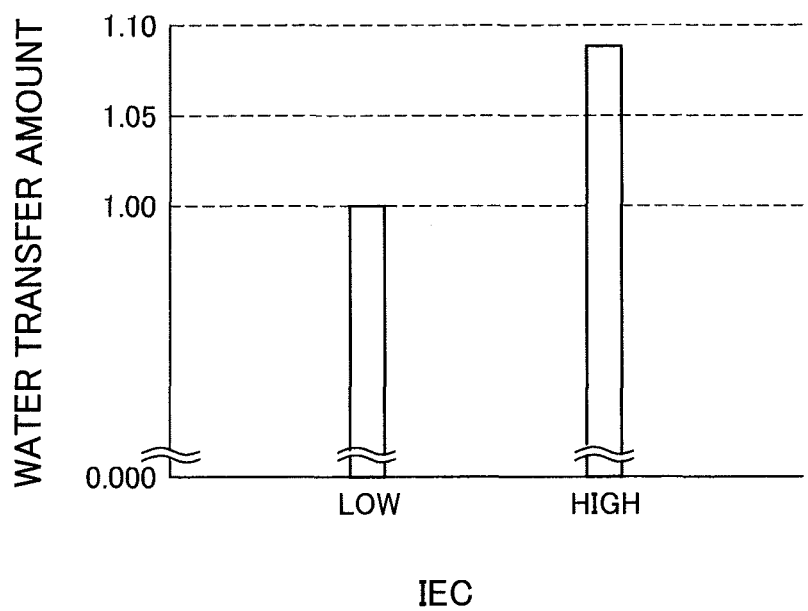
FIG. 32 illustrates the relationship between the I/C value of the electrolyte membrane and the anode-cathode water transfer amount.

In another modified structure, the electrolyte membrane in the anode midstream region may be made to have lower ion exchange capacity (IEC value) than the IEC value of the electrolyte membrane in the anode upstream region and in the anode downstream region. FIG. 32 illustrates the relationship between the IEC value of the electrolyte membrane and the anode-cathode water transfer amount. As shown in FIG. 32, the anode-cathode water (water vapor) transfer amount decreases (i.e., the anode-cathode water vapor transfer resistance increases) with a decrease in IEC value. Increasing the IEC value of the electrolyte membrane in the anode midstream region to be higher than the IEC value of the electrolyte membrane in the anode upstream region and in the anode downstream region causes the anode midstream region to have the higher water vapor transfer resistance than the anode upstream region and the anode downstream region. This modified structure also ensures the effect of sufficiently protecting the whole power generation area from drying and effectively preventing degradation of the power generation performance.

In still another modified structure, the anode diffusion layer 820 in the anode midstream region may be made to have the greater thickness than the thickness of the anode diffusion layer 820 in the anode upstream region and in the anode downstream region. Increasing the thickness of the anode diffusion layer 820 in the anode midstream region to be greater than the thickness of the anode diffusion layer 820 in the anode upstream region and in the anode downstream region causes the anode midstream region to have the higher water vapor transfer resistance than the anode upstream region and the anode downstream region. This modified structure also ensures the effect of sufficiently protecting the whole power generation area from drying and effectively preventing degradation of the power generation performance.

In another modified structure, the anode (anode catalyst layer) in the anode midstream region may be made to have the greater thickness than the thickness of the anode in the anode upstream region and in the anode downstream region. Increasing the thickness of the anode in the anode midstream region to be greater than the thickness of the anode in the anode upstream region and in the anode downstream region causes the anode midstream region to have the higher water vapor transfer resistance than the anode upstream region and the anode downstream region. This modified structure also ensures the effect of sufficiently protecting the whole power generation area from drying and effectively preventing degradation of the power generation performance.

F2. Modified Example 2

In the second embodiment described above, the density of the anode diffusion layer 820 in the anode midstream region is made higher than the density of the anode diffusion layer 820 in the anode upstream region and in the anode downstream region by increasing the PTFE content of the anode diffusion layer 820 in the anode midstream region to be greater than the PTFE content of the anode diffusion layer 820 in the anode upstream region and in the anode downstream region. The density of the anode diffusion layer 820 in the anode midstream region may be made higher than the density of the anode diffusion layer 820 in the anode upstream region and in the anode downstream region by pressing or compressing the anode diffusion layer 820 in the anode midstream region or by using a base material of the higher fiber density for the anode diffusion layer 820 in the anode midstream region. Like the second embodiment, such modification causes the anode midstream region to have the higher water vapor transfer resistance than the anode upstream region and the anode downstream region, thus ensuring the effect of sufficiently protecting the whole power generation area from drying and effectively preventing degradation of the power generation performance.

F3. Modified Example 3

Figures 33, 34:
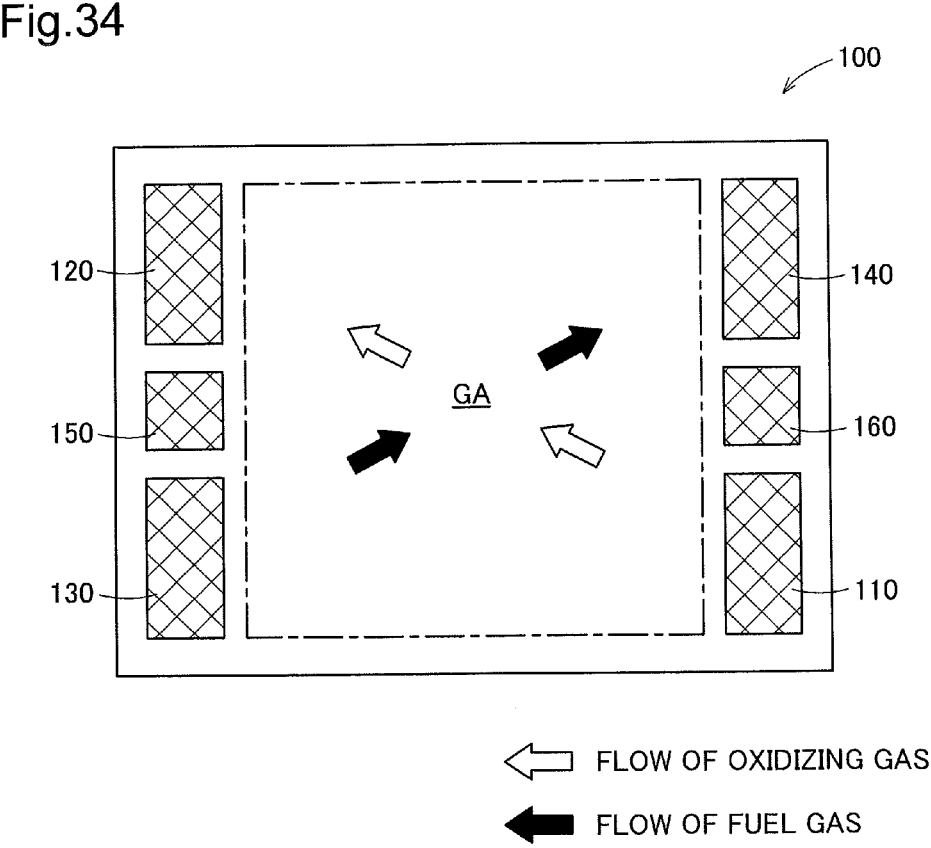
FIG. 33 illustrates an example of performance test results of the fuel cell with varying the widths of the anode upstream region and the anode downstream region.
FIG. 34 illustrates the plane of a fuel cell 100 according to a modified example.

In the respective embodiments described above, the anode upstream region has the width of one fourth of the whole width of the power generation area DA along the flow direction of the fuel gas. The anode downstream region has the width of one eighth of the whole width, and the anode midstream region has the remaining width (i.e., the width of five eighths of the whole width). The respective regions may, however, not be restricted to have these widths. The anode upstream region may have any width including the most upstream position of the power generation area DA along the flow direction of the fuel gas. Similarly the anode downstream region may have any width including the most downstream position of the power generation area DA along the flow direction of the fuel gas. FIG. 33 illustrates an example of performance test results of the fuel cell with varying the widths of the anode upstream region and the anode downstream region. According to the results shown in FIG. 33, the width of the anode upstream region is preferably not greater than one third of the whole width of the power generation area DA along the flow direction of the fuel gas, and the width of the anode downstream region is preferably not greater than one sixth of the whole width of the power generation area DA along the flow direction of the fuel gas. The anode midstream region preferably has the width including the center position of the power generation area DA along the flow direction of the fuel gas.

F4. Modified Example 4

In the respective embodiments described above, the fuel cell 100 is the counter-flow type fuel cell, in which the flow direction of the fuel gas is opposite to the flow direction of the oxidizing gas (i.e., the angle of the two flow directions is 180 degrees) as shown in FIG. 8. As long as the flow direction of the fuel gas and the flow direction of the oxidizing gas have the opposed relationship, it is not necessary that the two flow directions are completely opposite to each other. The flow direction of the fuel gas and the flow direction of the oxidizing gas having the opposed relationship means that the flow direction of the fuel gas is not equal to (i.e., is not parallel to) the flow direction of the oxidizing gas. The preferable relationship between the flow direction of the fuel gas and the flow direction of the oxidizing gas is that the upstream-side half region of the power generation area DA along the flow direction of the fuel gas and the downstream-side half region along the flow direction of the oxidizing gas respectively have over-half overlaps in the stacking direction. The angle of the flow direction of the fuel gas to the flow direction of the oxidizing gas is preferably in a range of 180±60 degrees or more preferably in a range of 180±30 degrees.

FIG. 34 illustrates the plane of a fuel cell 100 according to a modified example. In the fuel cell 100 shown in FIG. 34, the flow direction of the fuel gas has the angle of about 130 degrees to the flow direction of the oxidizing gas. In the fuel cell 100 of this modified example, most of the anode upstream region on the anode side faces most of the cathode downstream region on the cathode side in the stacking direction. Increasing the anode-cathode water vapor transfer resistance in the anode midstream region to be higher than the water vapor transfer resistance in the anode upstream region and in the anode downstream region sufficiently protects the whole power generation area from drying and effectively prevents degradation of the power generation performance.

F5. Modified Example 5

The materials for the respective members of the stacked assembly 800 and the respective members of the separator 600 are specified in the embodiments. These materials are, however, not restrictive, but any of various other materials may be used for the same purpose. For example, the anode-side porous flow path layer 840 and the cathode-side porous flow path layer 850 may be made of another material, such as carbon porous body, instead of the metal porous body used in the embodiments. The separator 600 may be made of another material, such as carbon, instead of the metal used in the embodiments.

In the respective embodiments described above, the separator 600 is structured by stacking three metal plates and has the flat area corresponding to the power generation area DA. The separator may be structured in any other shape; for example, a separator (made of, for example, carbon) having grooved flow paths for the reactive gas on the surface corresponding to the power generation area or a separator (prepared by, for example, pressing a metal plate) having corrugated surface to serve as the flow paths for the reactive gas in the area corresponding to the power generation area.

In the respective embodiments described above, the stacked assembly 800 includes the power generation layer 810, the anode diffusion layer 820 and the cathode diffusion layer 830 and the anode-side porous flow path layer 840 and the cathode-side porous flow path layer 850. This structure is, however, not restrictive. For example, the anode-side porous layer and the cathode-side porous layer may be omitted in the case of using the separator having the flow paths for the reactive gas or the separator having the corrugated surface to serve as the flow paths for the reactive gas.

What is claimed is:
1. A fuel cell, comprising:
a power generation layer including an electrolyte membrane, and an anode and a cathode provided on respective surfaces of the electrolyte membrane;
a fuel gas flow path layer located on a side of the anode of the power generation layer to supply a fuel gas to the anode while flowing the fuel gas along a flow direction of the fuel gas approximately orthogonal to a stacking direction in which respective layers of the fuel cell are stacked;
an oxidizing gas flow path layer located on a side of the cathode of the power generation layer to supply an oxidizing gas to the cathode while flowing the oxidizing gas along a flow direction of the oxidizing gas opposed to the flow direction of the fuel gas; and
an anode diffusion layer located between the anode and the fuel gas flow path layer, wherein
a power generation area of the fuel cell, in which electric power is generated, has an upstream region including a most upstream position along the flow direction of the fuel gas and a downstream region including a most downstream position along the flow direction of the fuel gas, and wherein
a midstream region, which is a remaining region of the power generation area other than the upstream region and the downstream region, has higher water vapor transfer resistance between the anode side and the cathode side than the upstream region and the downstream region, and wherein
a blocking portion, in which a gas flow path is blocked, is provided in the fuel gas flow path layer in the upstream region and in the downstream region, such that the upstream region and the downstream region have higher gas flow resistance than the midstream region.

2. A fuel cell, comprising:
a power generation layer including an electrolyte membrane, and an anode and a cathode provided on respective surfaces of the electrolyte membrane;
a fuel gas flow path layer located on a side of the anode of the power generation layer to supply a fuel gas to the anode while flowing the fuel gas along a flow direction of the fuel gas approximately orthogonal to a stacking direction in which respective layers of the fuel cell are stacked;

an oxidizing gas flow path layer located on a side of the cathode of the power generation layer to supply an oxidizing gas to the cathode while flowing the oxidizing gas along a flow direction of the oxidizing gas opposed to the flow direction of the fuel gas; and an anode diffusion layer located between the anode and the fuel gas flow path layer, wherein a power generation area of the fuel cell, in which electric power is generated, has an upstream region including a most upstream position along the flow direction of the fuel gas and a downstream region including a most downstream position along the flow direction of the fuel gas, and wherein a midstream region, which is a remaining region of the power generation area other than the upstream region and the downstream region, has higher water vapor transfer resistance between the anode side and the cathode side than the upstream region and the downstream region, and wherein the anode diffusion layer having higher density or greater thickness in the midstream region is provided, such that the midstream region has higher diffusion resistance than the upstream region and the downstream region.

3. A fuel cell, comprising:
a power generation layer including an electrolyte membrane, and an anode and a cathode provided on respective surfaces of the electrolyte membrane;

a fuel gas flow path layer located on a side of the anode of the power generation layer to supply a fuel gas to the anode while flowing the fuel gas along a flow direction of the fuel gas approximately orthogonal to a stacking direction in which respective layers of the fuel cell are stacked; and an oxidizing gas flow path layer located on a side of the cathode of the power generation layer to supply an oxidizing gas to the cathode while flowing the oxidizing gas along a flow direction of the oxidizing gas opposed to the flow direction of the fuel gas, wherein a power generation area of the fuel cell, in which electric power is generated, has an upstream region including a most upstream position along the flow direction of the fuel gas and a downstream region including a most downstream position along the flow direction of the fuel gas, and wherein a midstream region, which is a remaining region of the power generation area other than the upstream region and the downstream region, has higher water vapor transfer resistance between the anode side and the cathode side than the upstream region and the downstream region, and wherein the anode is provided, such that the midstream region has higher ratio of amount of ionomer to amount of catalyst-support carbon than the upstream region and the downstream region.

4. A fuel cell, comprising:
a power generation layer including an electrolyte membrane, and an anode and a cathode provided on respective surfaces of the electrolyte membrane;

a fuel gas flow path layer located on a side of the anode of the power generation layer to supply a fuel gas to the anode while flowing the fuel gas along a flow direction of the fuel gas approximately orthogonal to a stacking direction in which respective layers of the fuel cell are stacked; and an oxidizing gas flow path layer located on a side of the cathode of the power generation layer to supply an oxidizing gas to the cathode while flowing the oxidizing gas along a flow direction of the oxidizing gas opposed to the flow direction of the fuel gas, wherein a power generation area of the fuel cell, in which electric power is generated, has an upstream region including a most upstream position along the flow direction of the fuel gas and a downstream region including a most downstream position along the flow direction of the fuel gas, and wherein a midstream region, which is a remaining region of the power generation area other than the upstream region and the downstream region, has higher water vapor transfer resistance between the anode side and the cathode side than the upstream region and the downstream region, and wherein the anode is provided, such that the midstream region has greater thickness than the upstream region and the downstream region.

5. The fuel cell according to claim 1, wherein
the electrolyte membrane is provided, such that the midstream region has lower ion exchange capacity than the upstream region and the downstream region.

6. A fuel cell, comprising:
a power generation layer including an electrolyte membrane, and an anode and a cathode provided on respective surfaces of the electrolyte membrane;

a fuel gas flow path layer located on a side of the anode of the power generation layer to supply a fuel gas to the anode while flowing the fuel gas along a flow direction of the fuel gas approximately orthogonal to a stacking direction in which respective layers of the fuel cell are stacked;

an oxidizing gas flow path layer located on a side of the cathode of the power generation layer to supply an oxidizing gas to the cathode while flowing the oxidizing gas along a flow direction of the oxidizing gas opposed to the flow direction of the fuel gas; and an anode diffusion layer located between the anode and the fuel gas flow path layer, wherein a power generation area of the fuel cell, in which electric power is generated, has an upstream region including a most upstream position along the flow direction of the fuel gas and a downstream region including a most downstream position along the flow direction of the fuel gas, and wherein a midstream region, which is a remaining region of the power generation area other than the upstream region and the downstream region, has higher water vapor transfer resistance between the anode side and the cathode side than the upstream region and the downstream region, and wherein the anode diffusion layer is compressed in the midstream region, so that thickness of the anode diffusion layer in the midstream region is less than thickness of the anode diffusion layer in the upstream region and the downstream region, and the anode is provided, such that the midstream region has greater thickness than the upstream region and the downstream region.

7. The fuel cell according to claim 1, wherein
the oxidizing gas flow path layer includes a water accumulating portion which is provided in the upstream region of the fuel cell to facilitate acceleration of water.

8. A fuel cell, comprising:

a power generation layer including an electrolyte membrane, and an anode and a cathode provided on respective surfaces of the electrolyte membrane;

a fuel gas flow path layer located on a side of the anode of the power generation layer to supply a fuel gas to the anode while flowing the fuel gas along a flow direction of the fuel gas approximately orthogonal to a stacking direction in which respective layers of the fuel cell are stacked;

an oxidizing gas flow path layer located on a side of the cathode of the power generation layer to supply an oxidizing gas to the cathode while flowing the oxidizing gas along a flow direction of the oxidizing gas opposed to the flow direction of the fuel gas, wherein a power generation area of the fuel cell, in which electric power is generated, has an upstream region including a most upstream position along the flow direction of the fuel gas and a downstream region including a most downstream position along the flow direction of the fuel gas, and wherein a midstream region, which is a remaining region of the power generation area other than the upstream region and the downstream region, has higher water vapor transfer resistance between the anode side and the cathode side than the upstream region and the downstream region, and wherein the fuel gas flow path layer has a blocked flow path including blockage of fuel gas flow along the flow direction of the fuel gas in the upstream region and in the downstream region of the fuel cell, and a linear flow path without blockage of the fuel gas flow along the flow direction of the fuel gas in the midstream region of the fuel cell.

9. The fuel cell according to claim 1, wherein the midstream region includes a center position of the power generation area along the flow direction of the fuel gas.

\* \* \* \* \*